(12) United States Patent
Yuzurihara et al.

(10) Patent No.: US 8,797,003 B2
(45) Date of Patent: Aug. 5, 2014

(54) METHOD FOR CONTROLLING POWER FACTOR OF THREE-PHASE CONVERTER, METHOD FOR CONTROLLING REACTIVE POWER OF THREE-PHASE CONVERTER, AND CONTROLLER OF THREE-PHASE CONVERTER

(75) Inventors: Itsuo Yuzurihara, Zama (JP); Atsushi Takayanagi, Kamakura (JP); Yoshihisa Hata, Yokohama (JP); Tsuyoshi Okano, Ichikawa (JP)

(73) Assignee: Kyosan Electric MFG. Co., Ltd., Yokohama-shi (JP)

( * ) Notice: Subject to any disclaimer, the term of this patent is extended or adjusted under 35 U.S.C. 154(b) by 343 days.

(21) Appl. No.: 13/313,475

(22) Filed: Dec. 7, 2011

(65) Prior Publication Data

US 2012/0212191 A1 Aug. 23, 2012

(30) Foreign Application Priority Data

Feb. 22, 2011 (JP) .................................. 2011-036267

(51) Int. Cl.
*G05F 5/02* (2006.01)
*H02M 3/158* (2006.01)
*H02M 1/42* (2007.01)

(52) U.S. Cl.
CPC .......... *H02M 1/4208* (2013.01); *H02M 3/1584* (2013.01); *Y02B 70/126* (2013.01)
USPC ....................................................... 323/207

(58) Field of Classification Search
USPC .................................. 323/205, 207; 363/127
See application file for complete search history.

(56) References Cited

U.S. PATENT DOCUMENTS

2008/0130335 A1* 6/2008 Yuzurihara et al. ........... 363/125
2011/0134669 A1* 6/2011 Yuzurihara et al. ............. 363/89

FOREIGN PATENT DOCUMENTS

| JP | 2003-009593 A | 1/2003 |
| JP | 2003-274559 A | 9/2003 |
| JP | 2004-222447 A | 8/2004 |
| JP | 2006-262662 A | 9/2006 |
| JP | 2008-141887 A | 6/2008 |

OTHER PUBLICATIONS

"Specification for Semiconductor Processing Equipment Voltage SAG Immunity", SEMI F47-0200, 1999, 2000, pp. 859-864, cited in spec.

(Continued)

*Primary Examiner* — Adolf Berhane
*Assistant Examiner* — Yemane Mehari
(74) *Attorney, Agent, or Firm* — Westerman, Hattori, Daniels & Adrian, LLP

(57) ABSTRACT

In power conversion according to the three-phase converter, symmetrical component voltage values of a balanced system are calculated from wye-phase voltages on the three-phase AC input side of the three-phase converter. On the DC output side thereof, the power factor is set, an average active power value is calculated from an output voltage value and an output current value, and an average reactive power is calculated from the set power factor. On the basis of the symmetrical component voltage values, the average active power, and the active reactive power, a compensation signal for compensating for unbalanced voltages of the three-phase AC voltages and a control signal for controlling the power factor are generated, and according to the compensation signal and the control signal, a control signal for outputting DC is generated.

17 Claims, 18 Drawing Sheets

(56) References Cited

OTHER PUBLICATIONS

"Specification for Semiconductor Processing Equipment Voltage SAG Immunity", SEMI F47-0706, 1999, 2006, pp. 1-11, cited in spec.

J. K. Kang et al., "Control of Unbalanced Voltage PWM Converter Using Instantaneous Ripple Power Feedback", IEEE, 1997, pp. 503-508, cited in spec.

H. S. Kim et al., "Design of Current Controller for 3-Phase PWM Converter with Unbalanced Input Voltage", IEEE, 1998, pp. 503-509, cited in spec.

S. C. Ahn et al., "New Control Scheme of Three-Phase PWM AC/DC Converter Without Phase Angle Detection Under the Unbalanced Input Voltage Conditions", IEEE Transactions on Power Electronics, Sep. 2002, vol. 17, No. 5, pp. 616-622, cited in spec.

\* cited by examiner

VOLTAGE SAG COMPENSATION IS NOT PERFORMED

VOLTAGE SAG COMPENSATION IS PERFORMED e1a : 100% → 50% → 100%

VOLTAGE SAG COMPENSATION IS NOT PERFORMED
(10A/V)

VOLTAGE SAG COMPENSATION IS PERFORMED
(10A/V)

VOLTAGE SAG COMPENSATION IS NOT PERFORMED
(10A/V)

VOLTAGE SAG COMPENSATION IS PERFORMED
(10A/V)

Input Voltage

Input Current
VOLTAGE SAG
COMPENSATION IS
NOT PERFORMED
(20A/V)

Input Current
VOLTAGE SAG
COMPENSATION
IS PERFORMED
(20A/V)

e Ia : 100% → 50%   e Ib : 100%   e Ic : 100%

Input Voltage

Input Current

VOLTAGE SAG
COMPENSATION IS
NOT PERFORMED
(20A/V)

Input Current

VOLTAGE SAG
COMPENSATION
IS PERFORMED
(20A/V)

e1a : 0%   e1b : 100%   e1c : 100%

METHOD FOR CONTROLLING POWER FACTOR OF THREE-PHASE CONVERTER, METHOD FOR CONTROLLING REACTIVE POWER OF THREE-PHASE CONVERTER, AND CONTROLLER OF THREE-PHASE CONVERTER

BACKGROUND OF THE INVENTION

1. Field of the Invention

The present invention relates to unbalanced voltage compensation according to a three-phase converter, and more particularly, it relates to power factor control and reactive power control for improving a power factor and reactive power in a three-phase converter which converts three-phase AC power into DC power.

2. Description of the Related Art

It is known that occurrence of voltage reduction on the power source side, such as instantaneous voltage drop (voltage sag) and a long-term voltage reduction, has an impact on the load side which receives power supply from the power source, such as production line stop and defects in manufactured goods. In particular, since it has a significant impact on semiconductor manufacturing equipment, standards are established regarding the voltage sag; "SEMI F47-0200" (non-patent document 1), and "SEMI F47-0706" (non-patent document 2) (non-patent document 2). As for a testing method, it is described in "SEMI F42-0600".

Conventionally, this type of voltage sag has been addressed, for example, by installing an electric storage device such as a voltage sag compensator and an uninterruptible power supply (UPS), which employ a capacitor and a storage battery. The compensator using the electric storage device may have a configuration to be installed as a parallel device either on the power source side or on the load side. Alternatively, it may be installed as a serial device, being inserted between the power source side and the load side, with a configuration that the power system is switched at the time of voltage sag.

It is also known that when a short interruption or instantaneous voltage drop occurs in the three-phase AC input voltages of the (AC-DC) power converter for converting the three-phase AC power into DC power, the power supply to the load is maintained by the voltage sag compensator (for example, see patent document 1), and patent document 2.

FIG. 16 illustrates a configuration example of a conventional voltage fluctuation compensator 102. FIG. 16 illustrates a three-phase AC power source 101 in the form of wye connection having AC power sources 101a, 101b, and 101c for respective phases. However, in the conventional system using the electric storage device, it does not matter which connection is employed, the wye connection or delta connection. The voltage fluctuation compensator 102 is installed between the three-phase AC power source 101 and a DC load (not illustrated). It is to be noted here that the three-phase AC power source with the electric storage device is applicable to any of the wye connection and the delta connection.

In the voltage fluctuation compensator 102, as to the phases for the three-phase AC (a-phase, b-phase, and c-phase), the voltage compensation circuits 104a, 104b, and 104c for respective phases are serially connected, those voltage compensation circuits respectively being provided with capacitors 105a, 105b, and 105c as energy storage means, and a control circuit 103 is provided for controlling the voltage compensation circuits 104a, 104b, and 104c for the respective phases.

The three-phase AC power source is connected not only to three-phase equivalent loads, but also to various single-phase loads. Application of such various loads or influences such as weather phenomenon and accident phenomenon may occasionally cause a voltage sag in the state where the three phases are balanced or unbalanced.

The voltage compensation circuits 104a, 104b, and 104c for the respective phases, output compensating voltages for the respective phases based on a command from the control circuit 103, and compensate for the voltage fluctuations. The voltage fluctuation compensator 102 recharges the capacitors 105a, 105b, and 105c during the normal operation. In the event of short interruption or instantaneous voltage drop, the electric power discharged from the capacitors 105a, 105b, and 105c keeps a constant output voltage, thereby continuing power supply to the DC load.

There are following problems in the voltage sag compensator as described above, i.e., not only this system requires equipment investment for installing a large-sized electric storage device or a capacitor unit, but also periodic maintenance is necessary. Therefore, it has been demanded that power is supplied stably by means of converting the three-phase AC input power, even at the time of instantaneous voltage drop, without using the electric storage device. There has been also a demand for improvement of a power factor without using the electric storage device.

In order to address the problems above, followings are suggested; considering that the input voltages during the voltage sag become unbalanced in the three phases in the event of the instantaneous voltage drop, a three-phase PWM converter is employed to compensate for the voltage sag, by controlling the three-phase unbalanced input voltages during the voltage sag period, so as to achieve the voltage sag compensation without using the voltage fluctuation compensator employing the storage device. According to the voltage sag compensation by using the three-phase PWM converter, the electric power having been supplied in the normal state before the voltage sag state can be supplied continuously, even after the occurrence of the voltage sag.

Hereinafter, an explanation will be made how the three-phase PWM converter controls the three-phase unbalanced input voltages.

FIG. 17 illustrates an equivalent circuit in the event of voltage sag. In FIG. 17, $e_r$, $e_s$, and $e_t$ represent transmission line voltages balanced in three phases, $Z_1$ represents a transmission line impedance, $Z_{12}$, $Z_{23}$, and $Z_{31}$ are equivalent impedances at the time of voltage sag, $e_{ab}$, $e_{bc}$, and $e_{ca}$ represent line voltages unbalanced in three phases generated at the time of voltage sag, $e_{1o}$ represents a zero-phase-sequence voltage, and $Z_a$, $Z_b$, and $Z_c$ represent load impedance, which is expressed in the form of load impedance obtained by converting the DC load $R_{dc}$ (shown in FIG. 18) to the three-phase AC input side.

When the amplitude is assumed as $E_m$, the transmission line voltages balanced in three phases $e_r$, $e_s$, and $e_t$ are respectively expressed by the following equations (1) to (3):

$$e_r = E_m \cos \omega t \qquad (1)$$

$$e_s = E_m \cos(\omega t - 2\pi/3) \qquad (2)$$

$$e_t = E_m \cos(\omega t + 2\pi/3) \qquad (3)$$

Since $e_r$, $e_s$, and $e_t$ represent the transmission line voltages balanced in three phases, negative-phase-sequence component $e_{n(rst)}$ and zero-phase-sequence component $e_{o(rst)}$ do not appear. Therefore, the negative-phase-sequence component $e_{n(rst)}$ and the zero-phase-sequence component $e_{o(rst)}$ are expressed by the following equation (4):

$$e_{n(rst)}=e_{o(rst)}=0 \quad (4)$$

In the example of FIG. 17, the state where the voltage sag is occurring corresponds to the state that the equivalent impedances $Z_{12}$, $Z_{23}$, and $Z_{31}$ are applied to the transmission line impedance $Z_1$. On this occasion, the line voltages $e_{ab}$, $e_{bc}$, and $e_{ca}$ among the terminals a, b, and c go into the three-phase unbalanced state, and cause the zero-phase-sequence voltage $e_{1o}$ as shown in FIG. 17.

As shown in FIG. 18, with respect to the terminals a, b, and c in FIG. 17, the left side illustrates the three-phase AC power source 100B, and the right side illustrates a main circuit unit of the three-phase converter 200. The three-phase AC power source 100B is illustrated in such a manner as being equivalent to the three-phase balanced voltages $e_r$, $e_s$, and $e_t$, and unbalanced factors. In this illustration, application of the impedances $Z_{12}$, $Z_{23}$, and $Z_{31}$ as shown in FIG. 17 expresses the unbalanced factors in equivalent manner.

An unbalanced voltage compensator 400 uses given or measurable three-phase unbalanced input phase voltages to generate compensation signal. The three-phase PWM converter 200 is provided with a three-phase PWM circuit 200a and a three-phase PWM control pulse generator 200b. The three-phase PWM control pulse generator 200b generates control pulse signals based on the three-phase unbalanced input voltages generated in the unbalanced voltage compensator 400, thereby exercising the PWM control over the three-phase PWM circuit 200a. According to the PWM control, the three-phase PWM converter 200 supplies to the DC load 300, the DC voltage to which the unbalanced voltage compensation has been performed.

As described above, the three-phase unbalanced input voltages during the voltage sag are controlled by the three-phase PWM converter, and the compensation for the voltage sag can be achieved without using the voltage fluctuation compensator employing the electric storage device such as a capacitor or a storage battery.

However, in general, in order to control the three-phase PWM converter in which PFC (Power Factor Correction) is incorporated, it is necessary to derive wye-connection three-phase unbalanced phase voltages which are 120° out of phase with each other. After the process for converting derived detection signals into variables on a rotating coordinate system (dq-axis), they are separated into a positive-phase-sequence voltage, a negative-phase-sequence voltage, and a zero-phase-sequence voltage, and they are used as feedback signals which are necessary for the control.

For example, the following documents are known as describing the voltage sag compensation according to the three-phase PWM converter control; non-patent document 3, non-patent document 4, and non-patent document 5. In the three-phase PWM converter control described in those non-patent documents, three-phase unbalanced voltages of wye-connection, which are 120° out of phase with each other, are assumed as given or measurable input phase voltages.

On the other hand, a general three-phase power distribution system employs the delta connection. A voltage that can be actually measured in the delta connection three-phase power distribution is delta-connection three-phase voltage. The delta-connection three-phase voltage is a line voltage between each of the terminals of the delta connection, and a wye-connection voltage and a zero-phase-sequence voltage are actually unmeasurable. Consequently, in order to compensate for the three-phase unbalanced voltages in the delta-connection three-phase power distribution, by the three-phase PWM converter control conventionally suggested, it is necessary to derive wye-connection three-phase unbalanced phase voltages which are 120° out of phase with each other, from the line voltages being measured. When the voltage sag compensation is controlled by the three-phase PWM converter, it is necessary to convert delta-type voltages of the three-phase unbalanced voltages being received, into wye-type voltages, so as to obtain control parameters. In particular, it is significant to extract a zero-phase-sequence voltage.

For example, patent document 3 is known as disclosing an apparatus or a method for compensating for the instantaneous voltage drop by the control according to this three-phase PWM converter. The instantaneous voltage drop compensator as described in the patent document 3 is provided with a line phase voltage conversion means. The line phase voltage conversion means converts a line voltage signal being detected by a line voltage detection means into a phase voltage conversion signal, and generates a zero-phase-sequence voltage signal and phase voltage signals from this phase voltage conversion signal.

The line phase voltage conversion means detects peak values of the phase voltage conversion signals ($v_r'$, $v_s'$, $v_t'$), calculates coefficients k1, k2, and k3 based on these three peak values, and generates the zero-phase-sequence voltage signal v0 ($=k1 \cdot v_r' + k2 \cdot v_s' + k3 \cdot v_t'$) and the phase voltage signals ($v_r$, $v_s$, $v_t$) based on the coefficients k1, k2, and k3 being calculated.

In addition, there is known, as a method for controlling voltage and reactive power in an electric power system, that the electric power system is connected to equipment, such as a power capacitor, a shunt reactor, and a static var compensator (SVC). In the reactive power control according to the power capacitor and the shunt reactor, a unit capacity is selected based on a capacity of the system. In addition, in the reactive power control according to the SVC, a reactor is connected thereto, which controls current by a phase control according to a thyristor that is connected to a fixed capacitor.

In the reactive power control, reactive power is reduced by improving a power factor so that the power factor approaches 1 by minimizing a phase difference between voltage and current, thereby performing control to make apparent power equal to active power. When the power factor is 1, a current value under the same power condition becomes the minimum, and it is possible to reduce power loss due to Joule loss in a transmission line and wiring, and reduce load loss and the Joule loss in a transformer or the like. Therefore, power factor improvement for controlling the power factor to be 1 is generally performed.

Typically, a load in the power system is mainly an inductive load, and the current lags behind the voltage. Therefore, in general, the power factor improvement is performed by a capacitor which is a capacitive type (phase advance capacitor).

In the power factor improvement by the phase advance capacitor, it is necessary to change the reactive power which the phase advance capacitor compensates for, since power consumption fluctuates depending on a season, day or night. In the case where a value of the phase advance capacitor is fixed, the power factor becomes a leading power factor due to occurrence of excessive compensation for the reactive power in the case where the power consumption drops. Therefore, there is a possibility that Ferranti effect occurs where the voltage on the load side becomes higher than the voltage on the power feeding side. In order to prevent this Ferranti effect, it is necessary to adjust the value of the phase advance capacitor in accordance with the reactive power.

In addition, there is suggested a DC power supply system which adjusts unbalanced voltages and improves input power factor of a three-phase AC power source (for example, see patent document 4. This DC power supply system detects phase voltage of three-phase voltages and adjusts the phase of a drive pulse of each phase. Accordingly, the unbalanced voltages are adjusted and the current of each phase is kept balanced, thereby maintaining high efficiency. Setting the power factor to any value, not restricted to 1, is suggested in an inverter device (patent document 5).

PRIOR ART DOCUMENTS

Patent Document

[patent document 1]
Japanese Unexamined Patent Application Publication No. 2003-274559 (FIG. 1, paragraph [0018])
[patent document 2]
Japanese Unexamined Patent Application Publication No. 2004-222447)
[patent document 3]
Japanese Unexamined Patent Application Publication No. 2008-141887 (paragraphs [0043], from [0055] to [0059])
[patent document 4]
Japanese Unexamined Patent Application Publication No. 2006-262662 (paragraphs [0012] and [0033])
[patent document 5]
Japanese Unexamined Patent Application Publication No. 2003-009593 (paragraphs [0008])

Non-Patent Document

[non-patent document 1]
"Specification for Semiconductor Processing Equipment Voltage Sag Immunity", pp. 859-864, issued in September, 1999, as the first edition, and issued in February, 2000 (SEMI 1999, 2000) (SEMI 1999, 2001)
[non-patent document 2]
"Specification for Semiconductor Processing Equipment Voltage Sag Immunity", pp. 1-12, issued in September, 1999, as the first edition, and approved to be issued in May, 2006 (SEMI 1999, 2006)
[non-patent document 3]
J. K. Kang, S. K. Sul, "Control of Unbalanced Voltage PWM Converter Using Instantaneous Ripple Power Feedback", Power Electronic Specialist Conference, PESC 97, PP. 503-508 (1997-5)
[non-patent document 4]
H. S. Kim, H. S. Mok, G. H. Choe, D. S. Hyun, S. Y. Choe, "Design of Current Controller for 3-phase PWM Converter with Unbalanced Input Voltage", Power Electronics Specialist Conference, PESC 98, pp. 503-509 (1988-8)
[non-patent document 5]
S. C. Ahn, D. S. Hyun, "New Control Scheme of Three-Phase PWM AC/DC Converter Without Phase Angle Detection Under the Unbalanced Input Voltage Conditions", IEEE Transaction on Power electronics, pp. 616-622 (2009-9)

SUMMARY OF THE INVENTION

Problem to be Solved by the Invention

In terms of compensating for the three-phase unbalance, there is a problem as the following. According to the patent document 3, the line phase voltage conversion means converts the line voltage signals being measured into phase voltage conversion signals, and generates a zero-phase-sequence voltage signal and phase voltage signals based on the phase voltage conversion signals. With this configuration, it is possible to control the three-phase PWM converter based on the three-phase unbalanced voltages (line voltages) of a general three-phase power distribution system, and the three-phase unbalance compensation can be performed.

However, this line phase voltage conversion means detects peak values of the phase voltage conversion signals obtained by converting the line voltages, and generates the zero-phase-sequence voltage signal and the phase voltage signals according to the coefficients calculated based on these three peak values. Therefore, in order to generate the zero-phase-sequence voltage signal and the phase voltage signals, it is necessary to repeat measuring the line voltages more than once, so as to obtain the coefficients being optimum, and there is a possibility that a longer time may be taken to generate the signals.

If unbalanced voltages and phase angles of the wye-phase voltages are given, the line voltages being unbalanced can be determined from those wye-phase voltages according to a standardized manner. On the other hand, even though the unbalanced voltages and the phase angles of the line voltages are known, the wye-phase voltages cannot be determined according to a standardized manner from these line voltages. This is because a reference point of the wye-phase voltages cannot be specified, and there is infinite number of combinations of wye-phase voltages having the same unbalanced voltages and phase angles.

In order to control the three-phase PWM converter, it is necessary to have a relationship of 120° out of phase between the wye-phase voltages. Therefore, specific wye-phase voltages which are 120° out of phase with each other have to be selected from the infinite number of combinations of wye-phase voltages. When these specific wye-phase voltages which are 120° out of phase with each other are selected, a positive-phase-sequence voltage becomes in phase with a particular phase (a-phase) of the wye-phase voltages, and a DC component as a control target can be extracted according to the subsequent dq-axis conversion process. Therefore, it is convenient for the control of the three-phase PWM converter. In addition, a phase angle of the negative-phase-sequence voltage and a phase angle of the zero-phase-sequence voltage with respect to the positive-phase-sequence voltage, indicate the same angle in the direction opposite to each other, therefore enabling the zero-phase-sequence voltage to be derived.

Conventionally, in order to obtain the wye-phase voltages which are 120° out of phase with each other from the line voltages, it is necessary to detect the unbalanced state of voltages and further to select the wye-phase voltages which are 120° out of phase with each other, from the line voltages being measured. Therefore, it may take a longer processing time. By way of example, when the unbalanced state of voltages is detected in alternating current, it is necessary to monitor voltage fluctuations during at least ½ cycle.

In order to quickly compensate for the voltage unbalance by controlling the three-phase PWM converter, it is requested to reduce the time required for detecting the unbalance in voltages and generating a control signal, and thus it is necessary to derive instantaneous wye-phase voltages from instantaneous line voltages. It is to be noted here that the instantaneous line voltages are line voltages measured at a certain point of time, and the instantaneous wye-phase voltages are values of the line voltages derived based on the actual measured values of the line voltages being obtained at this point of time. The wye-phase voltages correspond one-to-one with the line voltages at the time of measurement, and this means that the wye-phase voltages can be obtained from values measured at one measuring point of time, without requiring measured values at multiple points.

In order to quickly eliminate on the load side, an influence caused by the instantaneous voltage drop, it is necessary to immediately generate the zero-phase-sequence voltage signal and the phase voltage signals which are required for controlling the three-phase PWM converter, in response to the fluctuation of the unbalanced state of the three-phase line voltages in the three-phase power distribution system. In the line phase voltage conversion means described above, it is anticipated that actual measurement of the line voltages is repeated more than once in order to generate the zero-phase-sequence voltage signal and the phase voltage signals. Therefore, there is a possibility that the response to the fluctuations in the unbalanced state of the three-phase line voltages becomes insufficient.

As a response to the instantaneous voltage drop, the specification for voltage sag immunity SEMI F47-0200 is known, for instance. The specification for voltage sag immunity SEMI F47-0200 defines a range in a wide band (a range of input voltage reduction from 0% to 100%) to be controlled by the voltage sag compensation. In this voltage sag immunity specification, it is defined that the voltage reduction rate within 0.2 seconds from the occurrence of voltage sag is 50%, and the voltage reduction rate from 0.2 seconds to 0.5 seconds is 70%, and the like.

If the response to the instantaneous voltage drop is insufficient, it is difficult to satisfy this specification for voltage sag immunity.

Conventionally, the following technique has not been known; i.e., using the three-phase unbalanced voltages of line voltages as the input voltage, instantaneous wye-phase voltages are derived from the instantaneous line voltages, thereby controlling the three-phase PWM converter and compensating for the unbalanced voltages.

In controlling the three-phase converter, there are problems as the following in terms of controlling a power factor and reactive power. In the patent document 5, it is known that the power factor is arbitrarily set in the inverter device. However, this power factor control relates to the power factor of an inverter which performs AC-AC conversion which supplies electric power at an arbitrary power factor, from a power generator to a commercial power supply system. Therefore, there is not a known technique for setting the power factor arbitrarily in controlling the three-phase converter which subjects the three-phase AC voltages to PWM conversion for outputting DC voltage.

In particular, in the case where three-phase voltages are unbalanced, a technique is not known which controls the three-phase PWM converter using as input voltage, three-phase unbalanced voltages of line voltages, so as to arbitrarily control the power factor.

In some cases, it is required to set the power factor arbitrarily in an electric power system. By way of example, "Guidelines for ensuring the technical requirements for interconnection of power quality" (Agency of Natural Resources and Energy, Oct. 1, 2004), "Guideline for interconnection technique in dispersed power supply system", or the like, defines the following; in the interconnection with distribution lines, "an adequate power factor of receiving point is set to be equal to or higher than 85%, in principle, and it is prevented that the power factor becomes leading power factor when viewed from the system side". In order to satisfy such definition, it is required to set the power factor arbitrarily.

As described above, if the power factor is controlled to be an arbitrary value or controlled to be 1, according to a conventional power factor control by making a selection of unit capacity of a power capacitor or a shunt reactor connected to a power system, there is a problem that a process or configuration for measuring the power factor is required. In addition, there is another problem that response to variation of the power factor in the three-phase line voltages becomes insufficient, from, the viewpoint of responsivity problem that the process for selecting the unit capacity or the like may hamper quick response.

In addition, similar to the aforementioned unbalanced voltage compensation, if the power factor control and the reactive power control are performed by controlling the three-phase PWM converter, using three-phase unbalanced voltages of line voltages as input voltage, it is necessary to repeat measurement of the line voltages, and generation of zero-phase-sequence voltage signal and the phase voltage signals in the line phase voltage conversion means. Therefore, there is also a problem that response to the variation of power factor becomes insufficient.

Consequently, in the conventional power factor control and reactive power control by the three-phase converter, there are following problems; it is difficult to arbitrarily control the power factor, the response to the power factor variation in three-phase line voltages is insufficient, and in controlling the power factor, a process or a configuration is required to measure the power factor.

Considering the situation above, an object of the present invention is to arbitrarily set and control the power factor and also control the reactive power in the three-phase converter, in order to solve the conventional problems as described above, Another object of the present invention is to control the power factor and the reactive factor, without the necessity of process or configuration for measuring the power factor in the three-phase converter.

Another object of the present invention is to control the three-phase PWM converter based on instantaneous wye-phase voltages obtained from instantaneous line voltages actually measured, and while compensating for unbalanced voltages, the power factor and the reactive power are controlled with a favorable responsivity to power factor variation in the three-phase line voltages.

It is to be noted that in three-phase AC, there are derived from one actually measured value of line voltages being three-phase unbalanced voltages generated in delta-connection; positive-phase-sequence voltage, negative-phase-sequence voltage, and zero-phase-sequence voltage being wye-connection three-phase unbalanced voltages which are 120° out of phase with each other at the time of actual measurement. According to these derived voltages, the three-phase PWM converter is controlled to compensate for the unbalanced voltages, and further, the power factor and the reactive power are controlled.

Here, the instantaneous values of line voltages are values of the line voltages actually measured at a certain point of time, and the instantaneous values of wye-phase voltages are values of the wye-phase voltages being derived based on the actual measured values of the line voltages.

In compensating for the unbalanced voltages, line voltages actually measured at a certain point of time are used, without using actual measurement values obtained at multiple measuring points, to derive the wye-phase voltages obtained at the measuring point of time, and the three-phase PWM converter is controlled by using the wye-phase voltages being derived.

Means for Solving Problem

FIG. 1 is a schematic diagram to explain the unbalanced voltage compensation and power factor control according to the present invention.

[Unbalanced Voltage Compensation]

Firstly, the unbalanced voltage compensation will be explained. The unbalanced voltages are compensated by using the line voltages at the terminals a, b, and c, in the case where the three-phase unbalanced voltages $e_{1a}$, $e_{1b}$, and $e_{1c}$ are not given or not directly measurable, and furthermore, instantaneous values of the wye-phase voltages of wye-connection which are 120° out of phase with each other are obtained by using the line voltages actually measured at one point of time, thereby performing the unbalance compensation.

In FIG. 17, in association with the respective terminals a, b, and c, the three-phase AC power source 100B side is illustrated as an equivalent circuit incorporating balanced voltages $e_r$, $e_s$, and $e_t$, a transmission impedance $Z_1$, and equivalent impedances $Z_{12}$, $Z_{23}$, and $Z_{31}$ in the event of voltage sag. Conventionally, as shown in FIG. 18, it is assumed that the unbalanced state of this three-phase AC power source 100B is caused by unbalancing factors against the balanced voltages $e_r$, $e_s$, and $e_t$. Therefore, the unbalanced voltage compensator 400 is capable of compensating for the three-phase unbalanced voltages under the condition that the three-phase unbalanced voltages $e_{1a}$, $e_{1b}$, and $e_{1c}$ are given or measurable. However, if these three-phase unbalanced voltages $e_{1a}$, $e_{1b}$, and $e_{1c}$ are unknown or unmeasurable, the unbalanced voltage compensation cannot be performed.

As against the conventional way to handle the unbalanced state as described above, in the unbalanced voltage compensation according to the present invention, the three-phase AC power source 100A as shown in FIG. 1 includes unbalanced voltages $e_{1a}$, $e_{1b}$, and $e_{1c}$, each with the phase angle of $2\pi/3$, and it is possible to assume that those unbalanced voltages induce the induced voltages $e_{ab}$, $e_{bc}$, and $e_{ca}$, respectively on the terminals a, b, and c. Consequently, the induced voltages $e_{ab}$, $e_{bc}$, and $e_{ca}$ can be treated as voltages generated from the three-phase unbalanced voltages $e_{1a}$, $e_{1b}$, and $e_{1c}$ in the three-phase AC power source 100A. In other words, these induced voltages can be assumed as making up for acquisition of the unbalanced voltages $e_{1a}$, $e_{1b}$, and $e_{1c}$, when those unbalanced voltages cannot be directly obtained.

According to the aforementioned overview for handling the unbalanced state in the unbalanced voltage compensation of the present invention, even when the three-phase unbalanced voltages $e_{1a}$, $e_{1b}$, and $e_{1c}$ are not given or unmeasurable, it is possible to obtain the three-phase unbalanced voltages $e_{1a}$, $e_{1b}$, and $e_{1c}$ by using the induced voltages $e_{ab}$, $e_{bc}$, and $e_{ca}$, thereby compensating for the unbalanced voltages. Here, the induced voltages $e_{ab}$, $e_{bc}$, and $e_{ca}$ correspond to the line voltages of the terminals a, b, and c, respectively.

The unbalanced voltage compensation of the present invention is directed to a compensation for unbalanced voltages of three-phase AC, in which instantaneous values of wye-phase voltages of wye-connection which are 120° out of phase with each other are derived from the instantaneous values of the line voltages, according to the line voltage/three-phase unbalanced voltage conversion unit 1A of the unbalanced voltage compensator 1, thereby controlling the three-phase PWM converter to compensate for the unbalanced voltages. Therefore, even in the case where the three-phase unbalanced input voltages are not given or hard to be measured, it is possible to perform the unbalanced voltage compensation.

The unbalanced voltage compensation of the present invention focuses attention on that input voltages in a general three-phase power distribution system are based on the delta-type connection (line voltages) instead of wye-type connection (wye-phase voltages), and by subjecting the line voltages to the vector operation, instantaneous values of the wye-phase voltages which are 120° out of phase with each other and the zero-phase-sequence voltage are derived. In order to control the three-phase converter, it is necessary to derive the wye-phase voltages and the zero-phase-sequence voltage. In the present invention, the wye-phase voltages obtained by the vector operation is subjected to the dq-axis conversion process, and a DC component of the positive-phase-sequence is extracted to be used as a feedback signal to control the three-phase converter.

The unbalanced voltage compensation of the present invention is intended for the line voltages being unbalanced in three phases in a general three-phase power distribution system, and according to a method for converting the line voltages into the wye-phase voltages by using a centroid vector operation, instantaneous values of the three-phase unbalanced voltages of wye-phase voltages which are 120° out of phase with each other and of the zero-phase-sequence voltage are derived from the instantaneous values of the line voltages being three-phase unbalanced voltages.

In calculating the wye-phase voltages from the line voltages as described above, the inventors of the present invention have found the following; in a triangle whose vertices are formed by the terminal voltages of respective phases in the three-phase AC voltages, when centroid vectors are obtained as to each line voltage vector connecting two terminals according to the centroid vector operation step of the present invention, the centroid of these centroid vectors agrees with a reference point of the zero-phase-sequence component of each of the wye-phase voltages which are 120° out of phase with each other.

The centroid vector voltages obtained from the line voltages include a positive-phase-sequence component and a negative-phase-sequence component of the symmetrical component voltages though they do not include the zero-phase-sequence component. Therefore, according to the relationship in which the centroid of the centroid vectors agrees with the reference point of the zero-phase-sequence component, it is possible to treat the centroid vector voltages as the wye-phase voltages which are 120° out of phase with each other according to the dq-axis conversion process.

In calculating the symmetrical component, each of the wye-phase voltages obtained in the centroid vector operation is subjected to the dq-axis conversion, calculates a d-axis voltage signal and q-axis voltage signal, subjects the d-axis voltage signal and the q-axis voltage signal being calculated to frequency separation, obtains a positive-phase-sequence voltage from a DC component, and calculates a negative-phase-sequence voltage from an AC component.

Since the wye-phase voltages obtained in the centroid vector operation do not include the zero-phase-sequence component, the zero-phase-sequence voltage is calculated by using amplitude calculated from the negative-phase-sequence voltage and a phase calculated from the positive-phase-sequence voltage and the negative-phase-sequence voltage, in order to calculate the zero-phase-sequence voltage in the symmetrical component calculation.

[Power Factor Control]

Next, the power factor control and the reactive power control will be explained. When average active power is represented by $P_{ave}$ and average reactive power is represented by $Q_{ave}$, the power factor $\cos \theta$ is defined as the following:

$$\cos \theta = P_{ave}/(P_{ave}^2 + Q_{ave}^2)^{1/2}$$

In the present invention, the power factor control and the reactive power control are performed according to the relationship among the power factor cos θ, the average active power $P_{ave}$ and average reactive power $Q_{ave}$.

According to the present invention, a power factor and reactive power controller 2 arbitrarily sets the power factor cos θ, and obtains the average active power $P_{ave}$ based on an output from the three-phase converter. Then, according to the average active power $P_{ave}$ being obtained and a value of the set power factor cos θ being arbitrarily configured, an associating average reactive power $Q_{ave}$ is obtained. Thereafter, according to the average active power and the average reactive power thus obtained, a control signal for controlling the three-phase converter is generated. With this configuration, the power factor is controlled by a set power factor that is arbitrarily configured, and the reactive power is controlled by the set power factor.

According to the relationship among the power factor cos θ, the average active power $P_{ave}$, and average reactive power $Q_{ave}$, the average reactive power $Q_{ave}$ is expressed as the following:

$$Q_{ave} + P_{ave} \cdot [1-(\cos \theta)^2]^{1/2}/\cos \theta$$

This equation represents that the average reactive power $Q_{ave}$ is determined by the average active power $P_{ave}$ and the set power factor cos θ.

In the present invention, the aforementioned relationship among the power factor, the average active power, and the average reactive power indicates that the power factor and the reactive power are controlled in view of the following; a control is possible using the power factor which is arbitrarily set with respect to the average active power, and the reactive power is controllable by the set power factor.

In the power factor control of the present invention, the average active power $P_{ave}$ is expressed as the following:

$$P_{ave} = \cos \theta \cdot \sqrt{\text{apparent power}} = \cos \theta \cdot (P_{ave}^2 + Q_{ave}^2)^{1/2}$$

Therefore, by setting the set power factor to "−1" and controlling the power factor and the reactive power, it is possible to regenerate power on the three-phase AC side, from the output of the three-phase converter.

The present invention includes following aspects; a method for controlling the power factor of the three-phase converter, a method for controlling the reactive power of the three-phase converter, and a controller of the three-phase converter. Any of those aspects are commonly provided with the following technical elements; the power factor cos θ is arbitrarily set, the average active power $P_{ave}$ is obtained from the output of the three-phase converter, the average reactive power $Q_{ave}$ is obtained in association with the set power factor cos θ based on the average active power $P_{ave}$ being obtained and a value of the set power factor cos θ. With this configuration, control is performed using the set power factor as to which the power factor is arbitrarily configured and the reactive power is controlled in association with the set power factor.

In addition, any of the aspects above are commonly provided with the technical elements regarding the unbalanced voltage compensation, i.e., the centroid vector operation, the symmetrical component calculation, and generation of signal for compensating for the unbalanced voltages.

The first aspect of the present invention relates to a power factor control method of the three-phase converter, and more particularly, it relates to a method for controlling the power factor, in a power conversion which subjects three-phase AC to PWM conversion for outputting DC.

The power factor control method according to the present invention is provided with, in the power conversion of the three-phase converter for subjecting the three-phase AC to PWM conversion for outputting DC, a symmetrical component calculation step, an average active power operation step, a power factor control step, a current command value generation step, and a constant current control step.

In the symmetrical component calculation step, symmetrical component voltage values of a three-phase balanced system are calculated from the wye-phase voltages of three-phase AC input of the three-phase converter, and in the average active power operation step, an average active power value is calculated by using an output voltage value and an output current value of the DC output from the three-phase converter. Then, in the power factor control step, an average reactive power value in association with the set power factor is calculated, from the average active power value calculated in the average active power operation step and the set power factor, based on the relationship among the average active power value, the average reactive power value, and the power factor. In the current command value generation step, a current command value is calculated from the average active power value calculated in the average active power operation step, the average reactive power value calculated in the power factor control step, and the symmetrical component voltage values of the three-phase AC voltages calculated in the symmetrical component calculation step. Then, in the constant current control step, based on the current command value and the input current value of the three-phase converter, the constant current control is performed on the positive-phase-sequence voltage value of the three-phase AC voltages, and a constant current control value is calculated.

On the basis of the constant current control value calculated in the constant current control step, a compensation signal for compensating for the unbalanced voltages of the three-phase AC voltages, and a control signal for controlling the power factor are generated. Then, wye-phase voltages being 120° out of phase with each other for controlling the unbalanced voltages and the power factor are obtained based on the compensation signal and the control signal thus generated. Finally, on the basis of the wye-phase voltages being obtained, the three-phase AC is subjected to the PWM conversion and a PWM control signal for outputting DC is generated. It is to be noted that the constant current control step forms a signal which combines the unbalanced voltage compensation signal and the power factor control signal.

In the symmetrical component calculation step of the present invention, the wye-phase voltages obtained from each of the line voltages in the three-phase AC in the centroid vector operation step are used as the wye-phase voltages of the three-phase AC input of the three-phase converter, the wye-phase voltages being used for calculating the symmetrical component voltage values of the three-phase balanced system, and accordingly, symmetrical components are calculated from the line voltages.

The centroid vector operation step is a step for obtaining wye-phase voltages which are 120° out of phase with each other, from each of the line voltages of the three-phase AC. A vector operation is performed as to all combinations of two line voltages which are selected from the three-phase line voltages. According to this vector operation, centroid vector voltages are obtained which are directed to respective terminal voltages from the terminal-voltage centroid. Then, the vector voltages being obtained are respectively rendered to be the wye-phase voltages which are 120° out of phase with each other. In the symmetrical component calculation step, symmetrical component voltage values of three-phase balanced system are calculated from the wye-phase voltages of the three-phase AC input of the converter, the voltages being obtained in the centroid vector operation step.

In the average active power operation step of the present invention, an integrated value of the output voltage value and the output current value of the DC output is added to a value obtained by subjecting a difference between the output voltage value and a voltage command value to a proportional-integral control (PI control), thereby calculating an average active power value.

In the power factor control step of the present invention, average reactive power is obtained according to the operation that multiplies the average active power value by $[(1-(\text{set power factor})^2)^{1/2}/(\text{set power factor})]$, thereby enabling the control of the average reactive power based on the set power factor.

In the power factor control step of the present invention, the set power factor is configured to be a negative value, thereby enabling power regeneration of the average active power value from the DC output side to the AC input side of the three-phase converter.

A second aspect of the present invention relates to a reactive power control method of the three-phase converter, and more particularly, it relates to a method for controlling the reactive power in the power conversion in which the three-phase AC is subjected to PWM conversion for outputting DC.

The reactive power control method of the present invention is provided with a symmetrical component calculation step, an average active power operation step, a reactive power control step, a current command value generation step, and a constant current control step, in the power conversion by the three-phase converter which subjects the three-phase AC to PWM conversion for outputting DC.

In the symmetrical component calculation step, symmetrical component voltage values of the three-phase balanced system are calculated from the wye-phase voltages of the three-phase AC input of the three-phase converter. In the average active power operation step, an output voltage value and an output current value of the DC output from the three-phase converter are used to calculate the average active power value. In the reactive power control step, on the basis of the relationship among the average active power value, the average reactive power value, and the power factor, an average reactive power value associated with the set power factor is calculated from the average active power value calculated in the average active power operations step and the set power factor. In the current command value generation step, a current command value is calculated from the average active power value calculated in the average active power operation step, the average reactive power value calculated in the reactive power control step, and the symmetrical component voltage values of the three-phase voltages calculated in the symmetrical component calculation step. In the constant current control step, on the basis of the current command value and an input current value of the three-phase converter, a positive-phase-sequence voltage value of the three-phase AC voltages is subjected to the constant current control, thereby calculating a constant current control value.

On the basis of the constant current control value calculated in the constant current control step, a compensation signal for compensating for the unbalanced voltages of the three-phase AC voltages and a control signal for controlling the reactive power are generated, and according to those compensation signal and the control signal, wye-phase voltages, being 120° out of phase with each other for controlling the unbalanced voltages and the reactive power, are obtained. Then, a PWM control signal which subjects the three-phase AC voltages to PWM conversion for outputting DC based on this obtained wye-phase voltage is generated. It is to be noted that the constant current control step forms a signal which combines the unbalanced voltage compensation signal and the reactive power control signal.

The symmetrical component calculation step of the present invention uses the wye-phase voltages obtained from each of the line voltages of the three-phase AC in the centroid vector operation step, as the wye-phase voltages of three-phase AC input of the three-phase converter that is used for calculating the symmetrical component voltage values of the three-phase balanced system, thereby enabling calculation of the symmetrical components from the line voltages.

The centroid vector operation step is a step for obtaining the wye-phase voltages being 120° out of phase with each other from each of the line voltages of three-phase AC. This step performs the vector operation as to all combinations of two line voltages selected from the line voltages. According to the vector operation, centroid vector voltages are obtained, directed from the centroid of the terminal voltages to the terminal voltages, respectively, and those obtained vector voltages are assumed as wye-phase voltages which are 120° out of phase with each other. The symmetrical component calculation step calculates symmetrical component voltage values of three-phase balanced system, from the wye-phase voltages of the three-phase AC input of the converter, which are obtained in the centroid vector operation step.

The average, active power operation step of the present invention adds an integrated value of the output voltage value and the output current value of the DC output to a value obtained by subjecting a difference between the output voltage value and the voltage command value to the proportional-integral control, thereby calculating the average active power.

The power factor control step of the present invention performs operation for multiplying the average active power value by $[(1-(\text{set power factor})^2)^{1/2}/(\text{set power factor})]$, thereby calculating an average reactive power value in association with the set power factor.

The third aspect of the present invention relates to a controller of the three-phase converter, and more particularly, it relates to the controller of the three-phase converter which performs power conversion by subjecting three-phase AC to PWM conversion for outputting DC.

The controller of the three-phase converter according to the present invention controls the three-phase converter which subjects three-phase AC voltages to PWM conversion for outputting DC, and it is provided with a symmetrical component calculation unit for calculating symmetrical component voltage values of a three-phase balanced system from wye-phase voltages of the three-phase AC input of the three-phase converter, an average active power operation unit for calculating an average active power value by using an output voltage value and an output current value of a DC output of the three-phase converter, a power factor and reactive power control unit for calculating an average reactive power value associated with a set power factor, from the average active power value calculated in the average active power operation unit and the set power factor, based on the relationship among the average active power value, the average reactive power value, and the power factor, a current command value generator for calculating a current command value, from the average active power value calculated in the average active power operation unit, the average reactive power value calculated in the power factor and reactive power control unit, and the symmetrical component voltage values of the three-phase AC voltages calculated in the symmetrical component calculation unit, and a constant current control unit for subjecting a positive-phase-sequence voltage value of the three-phase AC voltages to constant current control to calculate a constant current control value based on the current command value and the input current value of the three phase converter, wherein, a compensation signal for compensating for the unbalanced voltages of the three-phase AC voltages and a control signal for controlling a power factor are generated based on the constant current control value calculated in the constant current control unit, wye-phase voltages being 120° out of phase with each other for controlling the unbalanced voltages and the power factor are obtained based on the compensation signal and the control signal, and according to the wye-phase voltages thus obtained, a PWM control signal for subjecting the three-phase AC to the PWM conversion for outputting DC is generated. It is to be noted that the constant current control unit forms a signal which combines the unbalanced voltage compensation signal and the power factor control signal.

In the controller of the three-phase converter according to the present invention, in the centroid vector operation unit, wye-phase voltages are obtained from each of the line voltages of three-phase AC, and in the symmetrical component calculation unit, the wye-phase voltages obtained in the centroid vector operation unit are assumed as the wye-phase voltages of the three-phase AC input of the three-phase converter, and symmetrical component voltage values of the three-phase balanced system are calculated by using thus obtained wye-phase voltages.

The centroid vector operation unit is an operation unit for obtaining wye-phase voltages which are 120° out of phase with each other, from each of the line voltages of the three-phase AC. A vector operation is performed as to all combinations of two line voltages which are selected from the three-phase line voltages. According to this vector operation, centroid vector voltages are obtained which are directed to respective terminal voltages from the terminal-voltage centroid. Then, the vector voltages being obtained are respectively rendered to be the wye-phase voltages which are 120° out of phase with each other. In the symmetrical component calculation unit, symmetrical component voltage values of three-phase balanced system are calculated from the wye-phase voltages of the three-phase AC input of the converter, which are obtained in the centroid vector operation unit.

The average active power operation unit of the present invention adds an integrated value of the output voltage value and the output current value of the DC output, to a value obtained by subjecting a difference between the output voltage value and the voltage command value to the proportional-integral control, thereby calculating the average active power value.

The power factor and reactive power control unit of the present invention sets a power factor, and according to the operation that multiples the average active power value by $[(1-(\text{set power factor})^2)^{1/2}/(\text{set power factor})]$, thereby enabling calculation of the average reactive power, and controlling of the average reactive power based on the set power factor.

In the power factor and reactive power control unit of the present invention, the set power factor may be set to be a negative value, thereby enabling power regeneration of the average active power value, from the DC output side to the AC input side of the three-phase converter.

According to the aspects of the present invention, it is possible to set the power factor to an arbitrary value in the three-phase converter, and the power factor becomes controllable, and it is further possible to control the reactive power based on the set power factor.

According to the aspects of the present invention, the set power factor is set to be a negative value, thereby regenerating the power from the DC output side to the AC input side of the three-phase converter.

According to the aspect of the present invention for obtaining the wye-phase voltages from the line voltages, it is possible to derive the wye-phase voltages at one measuring point of time, based on the line voltages actually measured at one point of time, without using actually measured values of line voltages acquired at multiple measurement points. Since the wye-phase voltages can be obtained based on the values actually measured at one point of time, it is possible to reduce the time required for detecting unbalance in voltage and generating a control signal, thereby deriving instantaneous wye-phase voltages from instantaneous line voltages.

In addition, in the three-phase unbalanced voltage state, according to the converter control, it is possible to maintain rated output without using storage device, and output three-phase balanced current.

As explained above, according to each aspect of the present invention; the method for controlling power factor of the three-phase converter, the method for controlling reactive power of the three-phase converter, and the controller of the three-phase converter, it is possible to control the power factor to be an arbitrary set value and control the reactive power in the three-phase converter.

According to the present invention, it is possible in the three-phase converter, to perform the power factor control and reactive power control without the necessity of any process and configuration for measuring the power factor.

According to the present invention, the three-phase PWM converter is controlled based on the instantaneous wye-phase voltages obtained from the actually measured instantaneous line voltages, and it is possible to control the power factor and the reactive power with a favorable responsivity to the power factor variation in the three-phase line voltages, simultaneously with compensating for unbalanced voltages.

DESCRIPTION OF THE PREFERRED EMBODIMENTS

Hereinafter, preferred embodiments of the present invention will be explained in detail with reference to the accompanying drawings. With reference to FIG. 2 to FIG. 9, the power factor and reactive power control of the present invention will be explained, taking a three-phase converter as an example, and experimental results of the embodiments will be explained with reference to FIG. 10 to FIG. 15.

Figure 1:
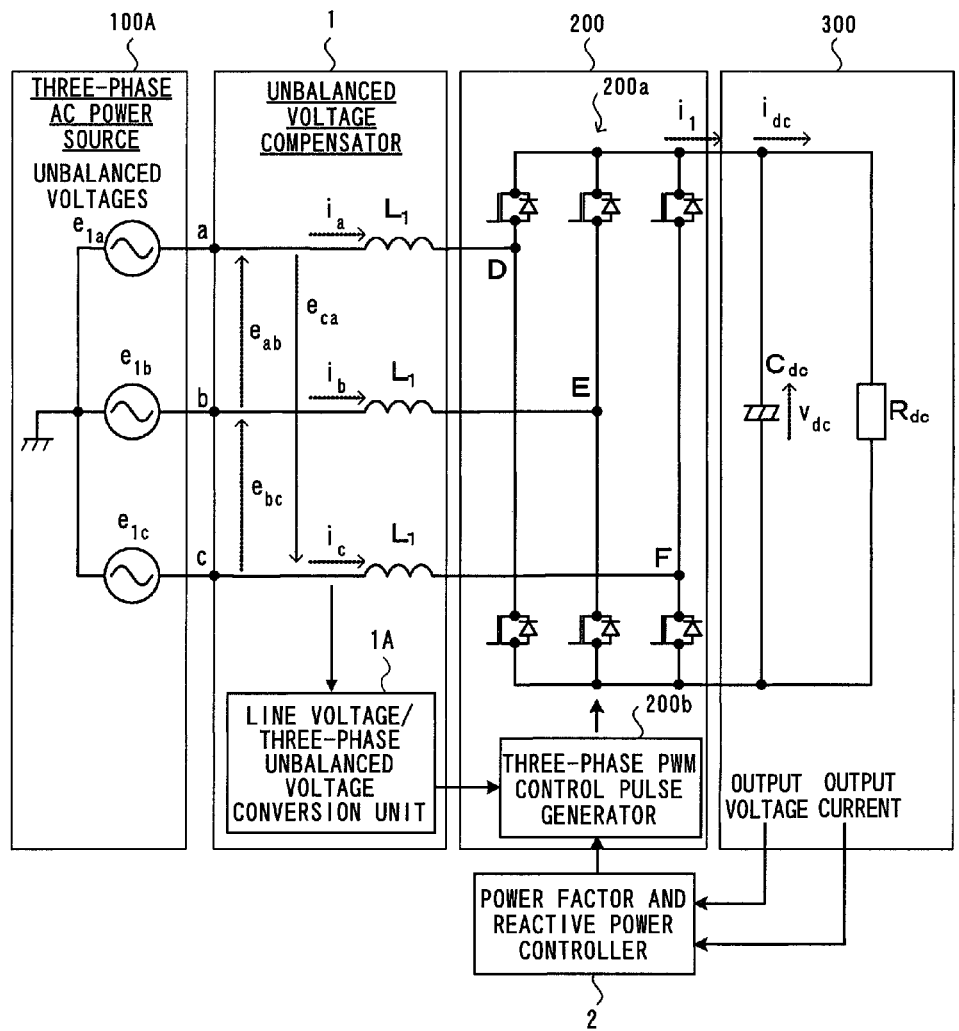
FIG. 1 is a schematic diagram to explain unbalanced voltage compensation and power factor control according to the present invention.
Figure 2:
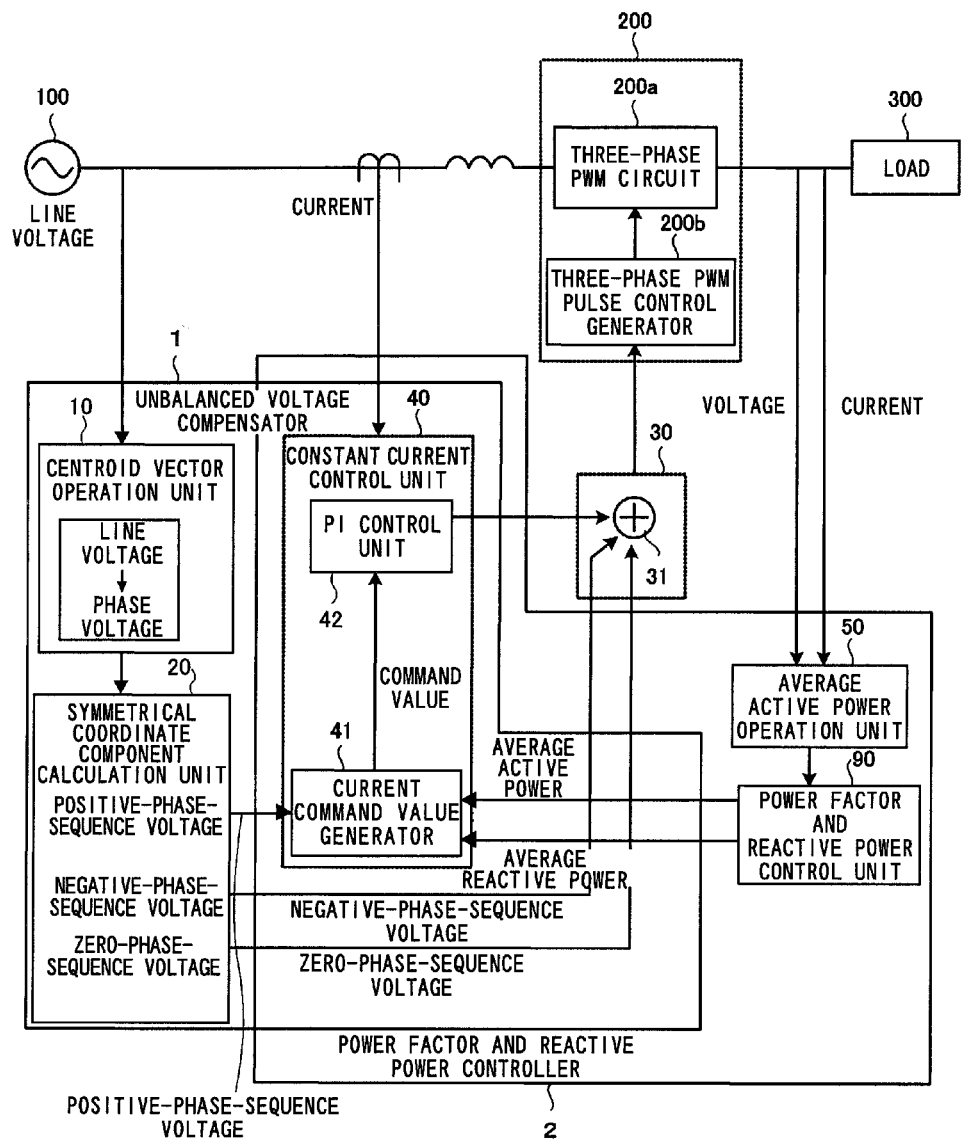
FIG. 2 illustrates a schematic configuration of an unbalanced voltage compensator and a power factor controller according to the present invention.

With reference to FIG. 2, a schematic configuration of the power factor and reactive power control of the present invention will be explained. In FIG. 2, a three-phase AC power source 100 supplies three-phase AC power, and the three-phase converter 200 subjects the three-phase AC power to the PWM conversion, and DC voltage is outputted to the DC load 300.

The three-phase converter according to the present invention is provided with the unbalanced voltage compensator 1, and the power factor and reactive power controller 2. The unbalanced voltage compensator 1 compensates for unbalanced voltages in the three-phase AC power, and suppresses fluctuations of the voltage outputted to the DC load 300. In addition, the power factor and reactive power controller 2 feedbacks the voltage and current inputted into the DC load 300, being the DC output from the three-phase converter 200, and performs power factor and reactive power control according to the PFC (Power Factor Correction) control.

The unbalanced voltage compensator 1 is provided with a centroid vector operation unit 10 to obtain from line voltages, wye phase voltages which are 120° out of phase with each other, a symmetrical coordinate component calculation unit 20 for calculating symmetrical component voltages of a three-phase balanced system, from the wye-phase voltages obtained by the centroid vector operation unit 10, and a constant current control unit 40 for forming a compensation signal for compensating for the unbalanced voltages in the three-phase AC voltages.

The power factor and reactive power controller 2 is provided with an average active power operation unit 50 for obtaining average active power according to a PI control based on a voltage value and a current value of the DC output from the three-phase converter 200, a power factor and reactive power control unit 90 for arbitrarily setting a power factor and controlling the power factor and reactive power by the set power factor, and the constant current control unit 40 for forming a control signal for controlling the power factor and the reactive power of the three-phase AC voltages.

The constant current control unit 40 has a configuration commonly used for forming the compensation signal for the unbalanced voltages, and for forming the control signal to control the power factor and the reactive power. An adder 30 adds zero-phase-sequence voltage and negative-phase-sequence voltage, to the output from the constant current control unit 40, and generates a PWM control signal for subjecting the three-phase AC voltages to the PWM conversion in the three-phase converter 200.

The three-phase converter 200 is provided with a three-phase PWM circuit 200a and a three-phase PWM pulse generator 200b for generating a pulse signal for controlling the operation of the three-phase PWM circuit 200a to perform the PWM control. The three-phase PWM pulse generator 200b forms the pulse signal based on the control signal generated in the adder 30. For example, the three-phase PWM circuit 200a may be formed by a bridged circuit which is made up of a switching element, and the pulse signal controls ON/OFF operation of the switching element to perform the PWM control.

The centroid vector operation unit 10 performs the vector operation as to all combinations of two line voltages selected from the line voltages. According to the vector operation, centroid vector voltages are obtained, directed from the centroid of the terminal voltages of delta connection, being three-phase line voltages, to the terminal voltages respectively, and those obtained vector voltages are outputted to the symmetrical coordinate component calculation unit 20, assuming these voltages as wye-phase voltages which are 120° out of phase with each other.

The symmetrical coordinate component calculation unit 20 calculates from the wye-phase voltages obtained in the centroid vector operation unit 10, positive-phase-sequence voltage, negative-phase-sequence voltage, and zero-phase-sequence voltage, which are symmetrical component voltages of the three-phase balanced system, and these voltages are outputted to the adder 30.

A configuration for compensating for the unbalanced voltages and for controlling the power factor and the reactive power, is made up of the followings; the constant current control unit 40 for performing constant current control based on the positive-phase-sequence voltage calculated in the symmetrical coordinate component calculation unit 20 and the feedback values of the input power directed to the load side, and generating a current command value, the average active power operation unit 50 for calculating the average active power according to the PI control based on the input current and the input voltage into the three-phase converter 200, a power factor and reactive power control unit 90 for setting the power factor and calculating the average reactive power based on the set power factor, and the adder 30 for adding the negative-phase-sequence voltage and the zero-phase-sequence voltage to the current command signal after the constant current control is performed. The zero-phase-sequence voltage is added as the compensation signal which compensates for the unbalanced voltages of three-phase AC voltages.

The adder 30 outputs the wye-phase voltages which are 120° out of phase with each other, in order to compensate for the unbalanced voltages, and control the power factor and the reactive power. The wye-phase voltages outputted from the adder 30 are inputted into the three-phase PWM pulse generator 200b in the three-phase converter 200, serving as the control signal for subjecting the three-phase AC voltages to the PWM conversion for outputting DC voltage.

The input power to be given as a feedback to the constant current control unit 40 can be acquired in the average active power operation unit 50, for example, by calculating average active power based on the current and the voltage being detected on the DC output side of the three-phase converter or on the load side.

[Calculate Wye-Phase Voltages by the Centroid Vector Operation]

Figure 3:
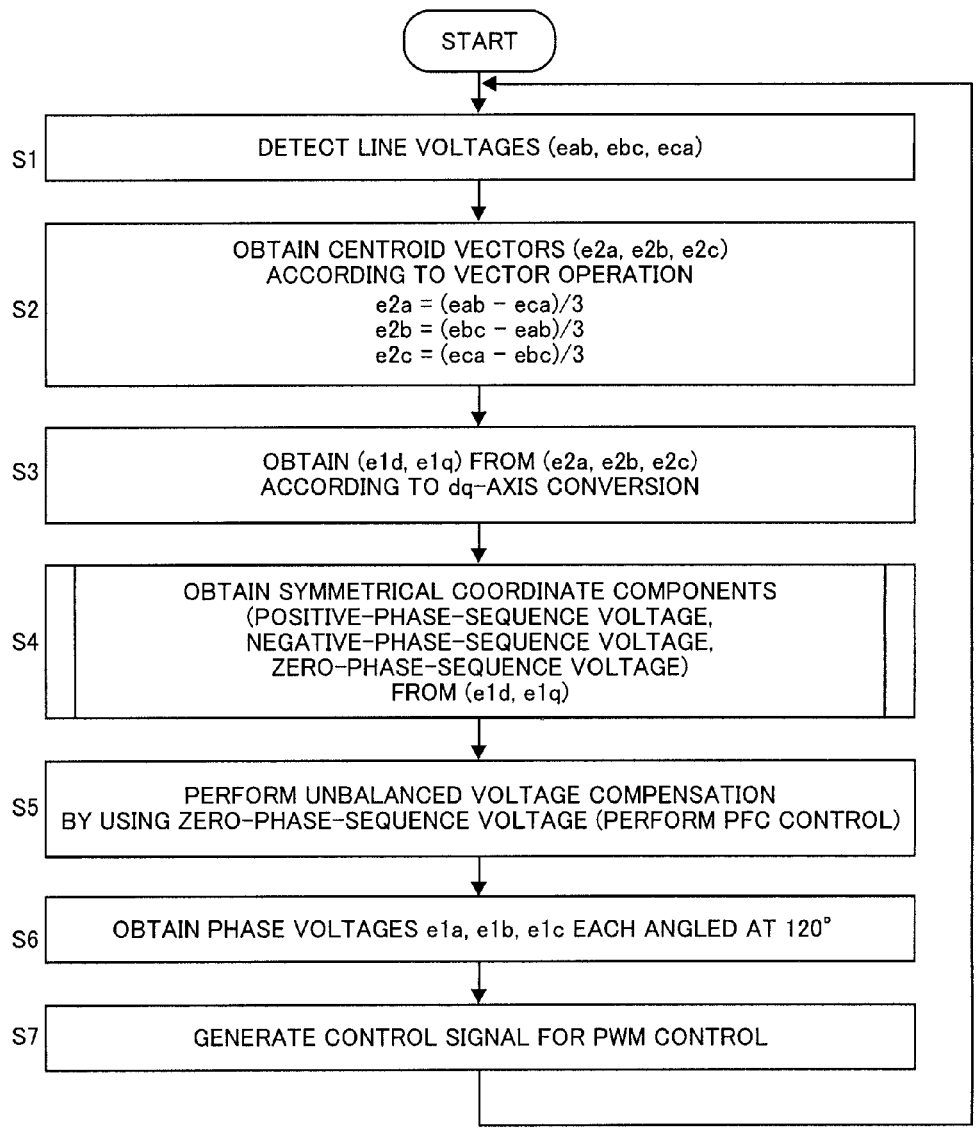
FIG. 3 is a flowchart to explain a procedure for obtaining wye-phase voltages from line voltages, according to the centroid vector operation in the unbalance compensation of the present invention.
Figure 4:
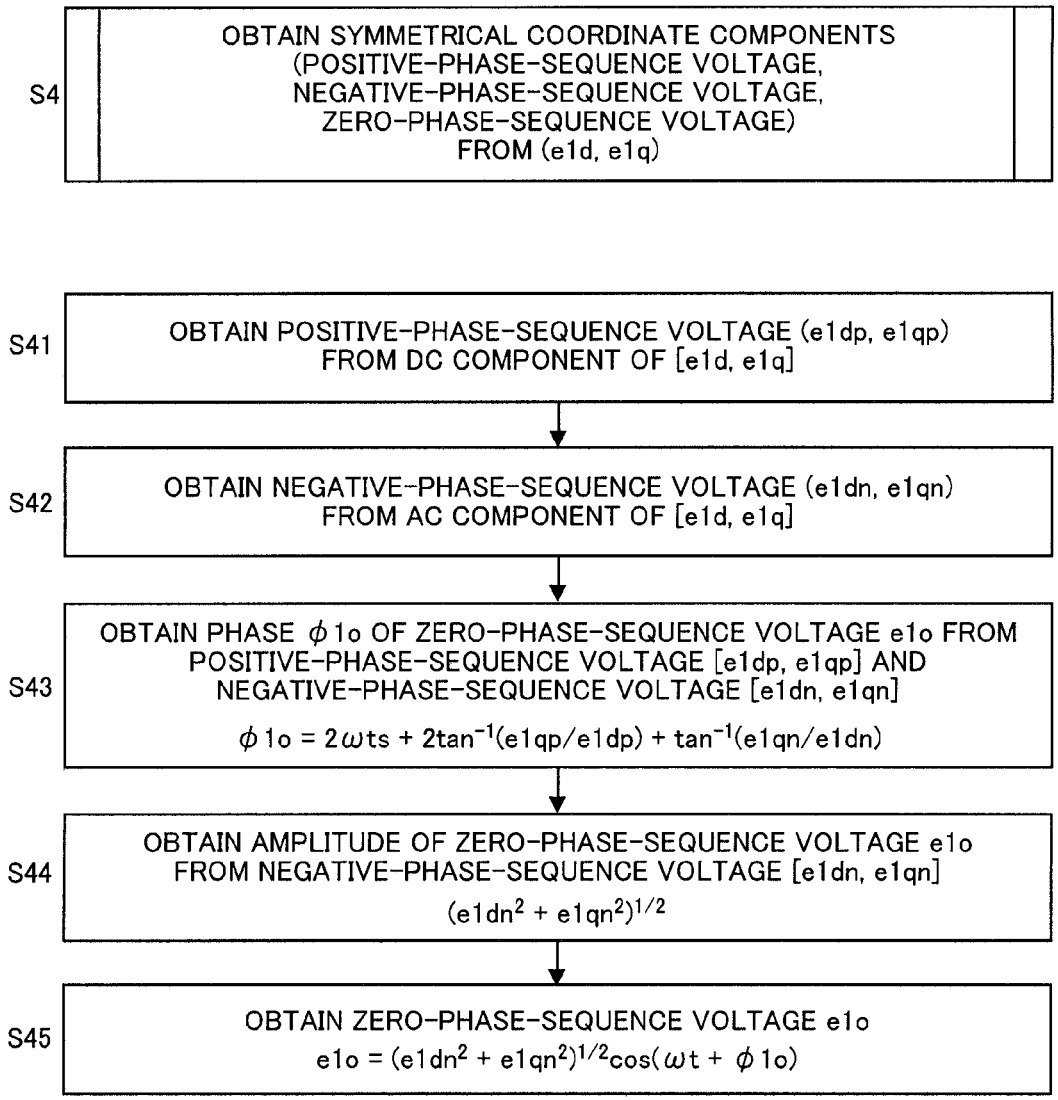
FIG. 4 is a flowchart to explain a procedure for calculating symmetrical component voltages from the wye-phase voltages, according to the centroid vector operation in the unbalance compensation of the present invention.

Next, in the unbalance compensation of the present invention, with reference to the flowcharts in FIG. 3 and FIG. 4, and the vector diagrams in FIG. 5 and FIG. 6, there will be explained a procedure for obtaining the wye-phase voltages which are 120° out of phase with each other from the line voltages by using the centroid vector operation, and a procedure for calculating symmetrical component voltages from the wye-phase voltages being obtained.

The line voltages ($e_{ab}$, $e_{bc}$, $e_{ca}$) between each of the three-phase AC terminals are detected. Here, the line voltage $e_{ab}$ is a vector voltage between the terminal "a" and the terminal "b", the line voltage $e_{bc}$ is a vector voltage between the terminal "b" and the terminal "c", and the line voltage $e_{ca}$ is a vector voltage between the terminal "c" and the terminal "a" (S1).

The line voltages being detected ($e_{ab}$, $e_{bc}$, $e_{ca}$) are subjected to the vector operation, and centroid vectors ($e_{2a}$, $e_{2b}$, $e_{2C}$) are calculated.

$$e_{2a}=(e_{ab}-e_{ca})/3 \tag{5}$$

$$e_{2b}=(e_{bc}-e_{ab})/3 \tag{6}$$

$$e_{2c}=(e_{ca}-e_{bc})/3 \tag{7}$$

The inventors of the present invention have focused attention on that there is a relationship as expressed by the following equation (8) between the centroid vectors ($e_{2a}$, $e_{2b}$, $e_{2c}$) calculated from the line voltages, and the wye-phase vector voltages ($e_{1a}$, $e_{1b}$, $e_{1c}$) which are 120° out of phase with each other.

$$e_{1a}=e_{2a}+e_{1o}$$

$$e_{1b}=e_{2b}+e_{1o}$$

$$e_{1c}=e_{2c}+e_{1o} \tag{8}$$

The equation (8) expresses that the wye-phase voltages ($e_{1a}$, $e_{1b}$, $e_{1c}$) which are 120° out of phase with each other are represented by the vectorial sum of the centroid vectors of the line voltages ($e_{2a}$, $e_{2b}$, $e_{2c}$) respectively, and the zero-phase-sequence voltage $e_{1o}$. According to the equation (8), the inventors of the present invention have found that it is possible to obtain the wye-phase voltages ($e_{1a}$, $e_{1b}$, $e_{1c}$) which are 120° out of phase with each other, from the centroid vectors of the line voltages ($e_{2a}$, $e_{2b}$, $e_{2c}$), by deriving the zero-phase-sequence voltage $e_{1o}$. Further, it is also found that according to this relationship, the positive-phase-sequence voltage $e_{1p}$ and the negative-phase-sequence voltage $e_{1n}$ of the wye-phase voltages ($e_{1a}$, $e_{1b}$, $e_{1c}$) which are 120° out of phase with each other, can be obtained from the centroid vectors ($e_{2a}$, $e_{2b}$, $e_{2c}$) of the line voltages.

The present invention utilizes the relationship between the centroid vectors of the line voltages and the wye-phase voltages. By using the centroid vectors ($e_{2a}$, $e_{2b}$, $e_{2c}$) easily calculated by the vector operation from the line voltages ($e_{ab}$, $e_{bc}$, $e_{ca}$) being the delta voltages, instead of directly detecting the wye-phase voltages ($e_{1a}$, $e_{1b}$, $e_{1c}$) which are 120° out of phase with each other, these centroid vectors ($e_{2a}$, $e_{2b}$, $e_{2c}$) are applied to the control of the three-phase PWM converter, thereby facilitating the compensation for the three-phase AC unbalanced voltages.

(Relationship Between the Centroid Vectors and the Phase Voltages)

Hereinafter, an explanation will be made regarding that the centroid vectors ($e_{2a}$, $e_{2b}$, $e_{2c}$) obtained by the vector operation correspond to the wye-phase voltages which are 120° out of phase with each other.

Figure 5:
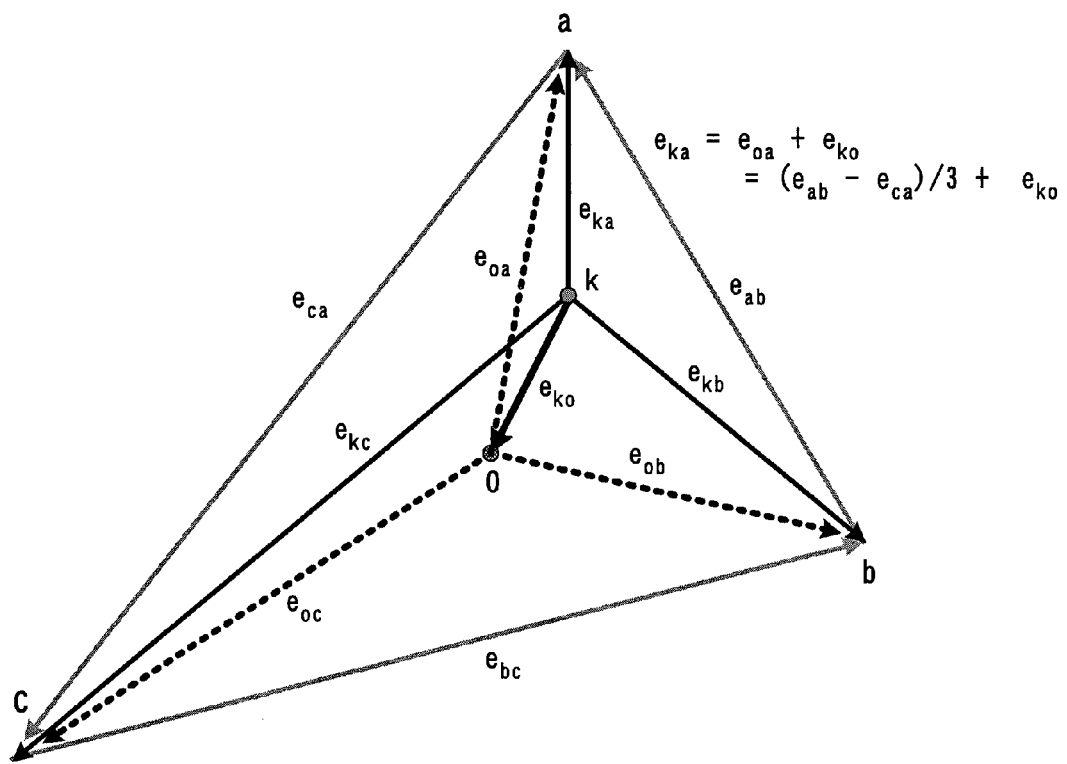
FIG. 5 illustrates a voltage vector diagram to explain the centroid vector operation in the unbalance compensation of the present invention.

FIG. 5 illustrates the relationship between the delta voltages and the wye-phase voltages. In FIG. 5, the delta voltages are represented by the line voltages ($e_{ab}$, $e_{bc}$, $e_{ca}$) between the terminals "a" and "b", "b" and "c", and "c" and "a". The wye-phase voltages ($e_{ka}$, $e_{kb}$, $e_{kc}$) are represented by the vector voltages from an arbitrary point k to each of the terminals a, b, and c. The point k is a reference point arbitrarily determined in the wye-phase voltages.

Here, if the wye-phase voltages ($e_{ka}$, $e_{kb}$, $e_{kc}$) are given, the delta voltages ($e_{ab}$, $e_{bc}$, $e_{ca}$) are determined in standardized manner. On the other hand, even when the delta voltages ($e_{ab}$, $e_{bc}$, $e_{ca}$) are given, the reference point k can be defined at any position and thus the point may exist countlessly. Therefore, the wye-phase voltages ($e_{ka}$, $e_{kb}$, $e_{kc}$) are not determined in standardized manner, and there exist infinite number of combinations that may be represented as the wye-phase voltages ($e_{ka}$, $e_{kb}$, $e_{kc}$). It is to be noted that the zero-phase-sequence voltage according to the wye-phase voltages ($e_{ka}$, $e_{kb}$, $e_{kc}$) is assumed as $e_{ko}$, and the point "o" is assumed as the reference point of the zero-phase-sequence voltage.

According to the relationship between the delta voltages (line voltages) and the wye-phase voltages as shown in FIG. 5, following equation is obtained:

$$\begin{aligned} e_{ab} - e_{ca} &= e_{ka} - e_{kb} - (e_{kc} - e_{ka}) \\ &= 3e_{ka} - (e_{ka} + e_{kb} + e_{kc}) \\ &= 3e_{ka} - 3e_{ko} \end{aligned} \tag{9}$$

According to the relationship of equation (9), the wye-phase voltages ($e_{ka}$, $e_{kb}$, $e_{kc}$) can be expressed by the following equations (10) to (12), by the delta voltages ($e_{ab}$, $e_{bc}$, $e_{ca}$) and the zero-phase-sequence voltage $e_{ko}$.

$$e_{ka}=(e_{ab}-e_{ca})/3+e_{ko} \tag{10}$$

$$e_{kb}=(e_{bc}-e_{ab})/3+e_{ko} \tag{11}$$

$$e_{kc}=(e_{ca}-e_{bc})/3+e_{ko} \tag{12}$$

On the other hand, as for the wye-phase voltages which are 120° out of phase with each other, when the phase angle ϕhd 1a of the a-phase is represented by α, the phase angles $\phi_{1a}$, $\phi_{1b}$, and $\phi_{1c}$ of the respective three phases a-phase, b-phase, and c-phase are expressed by;

$$\phi_{1a}=\alpha$$

$$\phi_{1b}=\alpha-2\pi/3$$

$$\phi_{1c}=\alpha+2\pi/3 \tag{13}$$

The phase angle of the positive-phase-sequence voltage is in phase with the a-phase of the wye-phase voltages having the relationship of 120° out of phase from each other. According to this relationship, a DC component as a control target of the three-phase PWM converter can be extracted by the dq-axis conversion, thereby facilitating the control of the three-phase PWM converter.

In addition, in the wye-phase voltages which are 120° out of phase with each other; the phase angle of the negative-phase-sequence voltage and that of the zero-phase-sequence voltage, with respect to the positive-phase-sequence voltage, are in the opposite direction at the same angle.

Figure 6A:
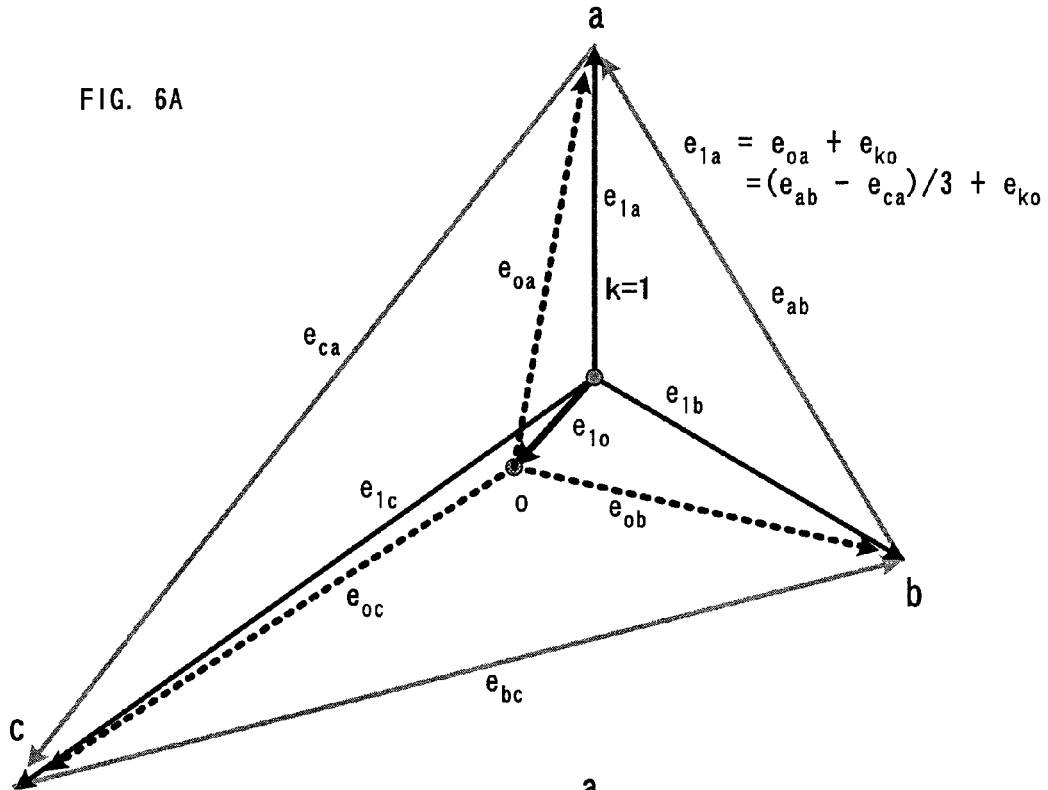
FIG. 6 illustrates voltage vector diagrams to explain the centroid vector operation in the unbalance compensation of the present invention.
Figure 6B:
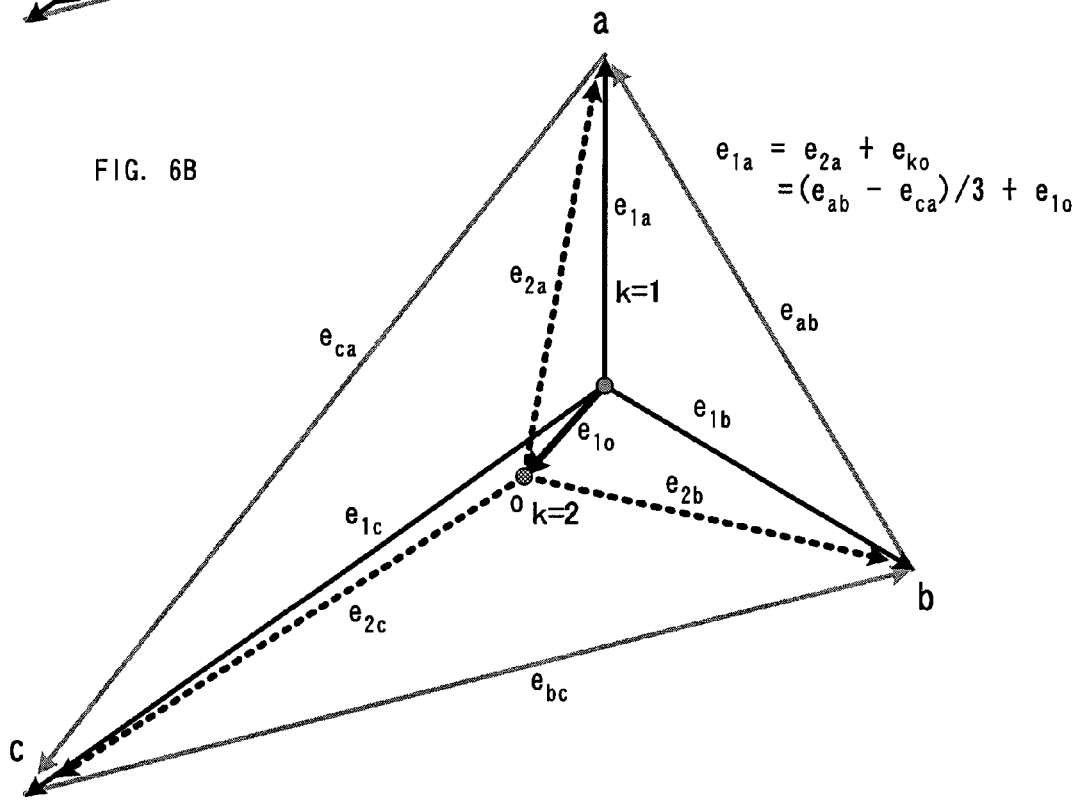

FIG. 6A illustrates the relationship between the wye-phase voltages which are 120° out of phase with each other and the reference point "o" of the zero-phase-sequence voltage. FIG. 6B illustrates the relationship between the wye-phase voltages which are 120° out of phase with each other and the reference point of the centroid vectors (centroid). In FIG. 6, the reference point of the wye-phase voltages which are 120° out of phase with each other is represented by K=1, and the reference point (centroid) of the centroid vectors is represented by K=2.

As shown in FIG. 6A, the wye-phase voltages ($e_{1a}$, $e_{1b}$, $e_{1c}$) which are 120° out of phase with each other are expressed by the following equation (14) assuming that K=1 in the equations (10) to (12):

$$e_{1a}=(e_{ab}-e_{ca})/3+e_{1o}=e_{oa}+e_{1o}$$

$$e_{1b}=(e_{bc}-e_{ab})/3+e_{1o}=e_{ob}+e_{1o}$$

$$e_{1c}=(e_{ca}-e_{bc})/3+e_{1o}=e_{oc}+e_{1o} \quad (14)$$

On the other hand, as shown in FIG. 6B, the centroid vectors ($e_{2a}$, $e_{2b}$, $e_{2c}$) are obtained by the vector operation, as to the two line voltages out of the delta voltages ($e_{ab}$, $e_{bc}$, $e_{ca}$) and when the point of the centroid vector is represented by K=2, the centroid vectors are expressed by the following equation (15) (S2):

$$e_{2a}=(e_{ab}-e_{ca})/3$$

$$e_{2b}=(e_{bc}-e_{ab})/3$$

$$e_{2c}=(e_{ca}-e_{bc})/3$$

$$e_{2o}=(e_{2a}+e_{2b}+e_{2c})/3=0 \quad (15)$$

According to FIG. 6B, when the wye-phase voltages ($e_{1a}$, $e_{1b}$, $e_{1c}$) which are 120° out of phase with each other are expressed by using the centroid vectors ($e_{2a}$, $e_{2b}$, $e_{2c}$), the aforementioned equation (8) can be obtained.

The equation (8) indicates that, as described above, the wye-phase voltages ($e_{1a}$, $e_{1b}$, $e_{1c}$) are represented by the vectorial sum of the respective centroid vectors of the line voltages ($e_{2a}$, $e_{2b}$, $e_{2c}$) and the zero-phase-sequence voltage $e_{1o}$.

On the other hand, as for the wye-phase voltages which are 120° out of phase with each other, when the phase angle of the a-phase is represented by α, the phase angles $\phi_{1a}$, $\phi_{1b}$, and $\phi_{1c}$ of the a-phase, b-phase, and c-phase respectively are expressed by:

$$\phi_{1a}=\alpha$$

$$\phi_{1b}=\alpha-2\pi/3$$

$$\phi_{1c}=\alpha+2\pi/3 \quad (16)$$

The phase angle of the positive-phase-sequence voltage is in phase with the a-phase of the wye-phase voltages which are 120° out of phase with each other.

With the relationship above, the DC component as a control target of the three-phase PWM converter can be extracted by the dq-axis conversion, thereby facilitating the control of the three-phase PWM converter (S3).

In the wye-phase voltages which are 120° out of phase with each other, the phase angle of the negative-phase-sequence voltage and that of the zero-phase-sequence voltage, with respect to the positive-phase-sequence voltage, are in the opposite direction at the same angle.

Therefore, instead of the wye-phase voltages ($e_{1a}$, $e_{1b}$, $e_{1c}$) which are 120° out of phase with each other, the centroid vectors of the line voltages ($e_{2a}$, $e_{2b}$, $e_{2c}$) are used to extract the positive-phase-sequence voltage $e_p$ and the negative-phase-sequence voltage $e_q$ from these centroid vectors ($e_{2a}$, $e_{2b}$, $e_{2c}$) thereby taking out the DC component as a control target of the three-phase PWM converter, and it is further possible to compensate for the unbalanced voltages by extracting the zero-phase-sequence voltage (S4).

Next, the centroid vectors ($e_{2a}$, $e_{2b}$, $e_{2c}$) obtained in the step S2 are subjected to the dq-axis conversion process, and the d-axis component $e_{1d}$ and the q-axis component $e_{1q}$ are obtained. This conversion is conducted so as to control the three-phase PWM converter by the DC component (S3).

In order to perform the dq-axis conversion, a spatial vector is converted into a real vector. When the phase difference between the wye-phase voltages ($e_{1a}$, $e_{1b}$, $e_{1c}$) and the three-phase balanced voltage ($e_r$, $e_s$, $e_t$) are assumed as α, the wye-phase voltages ($e_{1a}$, $e_{1b}$, $e_{1c}$) are equivalent to a real part of the wye-phase voltages represented by the spatial vector, and they are expressed by the following equation (17):

$$e_{1a}=E_{1am}\cos(\omega t+\alpha)$$

$$e_{1b}=E_{1bm}\cos(\omega t+\alpha-2\pi/3)$$

$$e_{1c}=E_{1cm}\cos(\omega t+\alpha+2\pi/3) \quad (17)$$

When these wye-phase voltages are subjected to the dq-axis conversion, the d-axis, the q-axis and the zero-phase-sequence component can be obtained. However, in the delta connection, it is not possible to directly detect the wye phase voltages ($e_{1a}$, $e_{1b}$, $e_{1c}$) which are 120° out of phase with each other, and they are not given. Therefore, the zero-phase-sequence voltage $e_{1o}$ is unclear.

In the present invention, instead of the wye-phase voltages ($e_{1a}$, $e_{1b}$, $e_{1c}$) which cannot be detected directly, the centroid vectors ($e_{2a}$, $e_{2b}$, $e_{2c}$) are employed, which are obtained by subjecting detectable line voltages to the centroid vector operation. Accordingly, with the line voltages at one measurement point of time, it is possible to compensate for the three-phase unbalanced voltages.

When the wye-phase voltages ($e_{1a}$, $e_{1b}$, $e_{1c}$) of the equation (8) are subjected to the dq-axis conversion, following equation (18) is established:

$$\begin{bmatrix}e_{1d}\\e_{1q}\\e_{1z}\end{bmatrix}=\frac{2}{3}\begin{bmatrix}\cos\omega t & \cos(\omega t-2\pi/3) & \cos(\omega t+2\pi/3)\\-\sin\omega t & -\sin(\omega t-2\pi/3) & -\sin(\omega t+2\pi/3)\\1 & 1 & 1\end{bmatrix}\begin{bmatrix}e_{1a}\\e_{1b}\\e_{1c}\end{bmatrix} \quad (18)$$

When the centroid vectors ($e_{2a}$, $e_{2b}$, $e_{2c}$) of the equation (15) are subjected to the dq-axis conversion, following equation (19) is established:

$$\begin{bmatrix} e_{2d} \\ e_{2q} \\ e_{2z} \end{bmatrix} = \frac{2}{3} \begin{bmatrix} \cos\omega t & \cos(\omega t - 2\pi/3) & \cos(\omega t + 2\pi/3) \\ -\sin\omega t & -\sin(\omega t - 2\pi/3) & -\sin(\omega t + 2\pi/3) \\ 1 & 1 & 1 \end{bmatrix} \begin{bmatrix} e_{2a} \\ e_{2b} \\ e_{2c} \end{bmatrix} \quad (19)$$

$$= \begin{bmatrix} e_{1d} \\ e_{1q} \\ 0 \end{bmatrix}.$$

The d-axis components $e_{1d}$, $e_{2d}$, and the q-axis components $e_{1q}$, $e_{2q}$ after the dq-axis conversion, expressed by the equations (18) and (19), are not influenced by the zero-phase-sequence voltage $e_{1o}$ expressed by the equation (14), and the values of the d-axis components are equal to each other, and the values of the q-axis components are equal to each other.

When the equation (19) is employed, which is obtained by subjecting the equation (15) to the dq-axis conversion, the equation (15) expressing the instantaneous line voltages ($e_{ab}$, $e_{bc}$, $e_{ca}$) obtained at one measurement point, it is possible to respond to the PFC control at high speed, by acquiring the line voltages at one measurement point without using the values at multiple measurement points of time.

It is to be noted that if the PFC control is performed by using the equation (19), the zero-phase-sequence voltage $e_{1o}$ does not appear in the equation (19). Therefore, the zero-phase-sequence voltage $e_{1o}$ is calculated by using the positive-phase-sequence voltage and the negative-phase-sequence voltage. Calculation of the zero-phase-sequence voltage $e_{1o}$ will be described in the following (S3).

Next, symmetrical component voltages (positive-phase-sequence voltage, negative-phase-sequence voltage, and zero-phase-sequence voltage) are obtained from the d-axis component $e_{1d}$ and the q-axis component $e_{1q}$, which are acquired by the dq-axis conversion (S4).

(Calculation of the Symmetrical Component Voltages)

Hereinafter, with reference to the flowchart shown in FIG. 4, the calculation of the symmetrical component voltages will be explained.

As to the wye-phase voltages ($e_{1a}$, $e_{1b}$, $e_{1c}$) which are 120° out of phase with each other, when the positive-phase-sequence voltage is assumed as $e_{1p}$, the negative-phase-sequence voltage is assumed as $e_{1n}$, and the zero-phase-sequence voltage is assumed as $e_{1o}$, the wye-phase voltages ($e_{1a}$, $e_{1b}$, $e_{1c}$) are expressed by the following:

$e_{1a}e_{1p}e_{1n}+e_{1o}$ $e_{1b}+e_{1p}\cdot e^{-j2\pi/3}+e_{1n}\cdot e^{j2\pi/3}+e_{1o}$ $e_{1c}+e_{1p}\cdot e^{j2\pi/3}+e_{1n}\cdot e^{-j2\pi/3}+e_{1o}$ $e_{1a}=E_{1pm}\cos(\omega t+\alpha)+E_{1nm}\cos(\omega t+\phi_{1n})+E_{1om}\cos(\omega t+\phi_{1o})$ $e_{1b}=E_{1pm}\cos(\omega t+\alpha-2\pi/3)+E_{1nm}\cos(\omega t+\phi_{1n}+2\pi/3)+E_{1om}\cos(\omega t+\phi_{1o})$ $e_{1c}=E_{1pm}\cos(\omega t+\alpha 2\pi/3)+E_{1nm}\cos(\omega t+\phi_{1n}-2\pi/3)+E_{1om}\cos(\omega t+\phi_{1o})$ (20)

By subjecting those elements to the dq-axis conversion, the following equation (21) is obtained.

$$\begin{bmatrix} e_{1d} \\ e_{1q} \end{bmatrix} = \begin{bmatrix} e_{1dp} \\ e_{1qp} \end{bmatrix} + \begin{bmatrix} e_{1dn} \\ e_{1qn} \end{bmatrix} \quad (21)$$

$$= E_{1pm}\begin{bmatrix} \cos\alpha \\ \sin\alpha \end{bmatrix} + E_{1nm}\begin{bmatrix} \cos(2\omega t + \phi_{1n}) \\ -\sin(2\omega t + \phi_{1n}) \end{bmatrix}$$

The positive-phase-sequence voltage ($e_{1dp}$, $e_{1qp}$) in the equation (21) corresponds to the DC component, and the negative-phase-sequence voltage ($e_{1dn}$, $e_{1qn}$) in the equation (21) corresponds to the AC component. Therefore, it is possible to extract the positive-phase-sequence voltage ($e_{1dp}$, $e_{1qp}$) and the negative-phase-sequence voltage ($e_{1dn}$, $e_{1qn}$), according to the frequency separation.

This frequency separation can be performed by using a band pass filter or a low pass filter. By way of example, the positive-phase-sequence voltage ($e_{1dp}$, $e_{1qp}$) can be extracted by the low pass filter, and ($E_{1pm}\cos\alpha$, $E_{1pm}\sin\alpha$) are acquired. In addition, the negative-phase-sequence voltage ($e_{1dn}$, $e_{1qn}$) can be extracted by subtracting the positive-phase-sequence voltages ($e_{1dp}$, $e_{1qp}$) being extracted, from the original signals having been subjected to the dq-axis conversion, and ($E_{1nm}\cos(2\omega t+\phi_{1n})$, $-E_{1nm}\sin(2\omega t+\phi_{1n})$) are acquired (S41, S42).

When the clock time of the measuring point is assumed as "$t_s$", the phase angle $\alpha$ of the positive-phase-sequence voltage and the phase angle $\phi_{1n}$ of the negative-phase-sequence voltage can be obtained, respectively by the equation (22) and the equation (23):

$\alpha = \tan^{-1}(e_{1qp}/e_{1dp})$ (22)

$\phi_{1n} = -2\omega t_s - \tan^{-1}(e_{1qn}/e_{1dn})$ (23)

The negative-phase-sequence voltage $e_{1n}$ is expressed by the equation (25) and the equation (26), according to the equation (24):

$3e_{1n} = E_{1am}\cos(\omega t + \alpha) + E_{1bm}\cos(\omega t + \alpha + 2\pi/3) + E_{1cm}\cos(\omega t + \alpha - 2\pi/3)$ (24)

$$e_{1n} = \frac{1}{3}\sqrt{\left\{E_{1am} - \frac{1}{2}(E_{1bm} + E_{1cm})\right\}^2 + \left\{\frac{\sqrt{3}}{2}(E_{1bm} - E_{1cm})\right\}^2} \quad (25)$$

$$\cos(\omega t + \alpha + \phi')$$

$$\phi' = \tan^{-1}\left(\frac{\frac{\sqrt{3}}{2}(E_{1bm} - E_{1cm})}{E_{1am} - \frac{1}{2}(E_{1bm} + E_{1cm})}\right) \quad (26)$$

In addition, the zero-phase-sequence voltage $e_{1o}$ is expressed by the equation (27):

$$e_{1o} = \frac{1}{3}\sqrt{\left\{E_{1am} - \frac{1}{2}(E_{1bm} + E_{1cm})\right\}^2 + \left\{\frac{\sqrt{3}}{2}(E_{1bm} - E_{1cm})\right\}^2} \quad (27)$$

$$\cos(\omega t + \alpha - \phi')$$

In the equation above, according to the relationship that:

$$E_{1om}=E_{1nm}$$

$$\phi_{1n}=\alpha+\phi'$$

$$\phi_{1o}=\alpha-\phi',$$

the following relationship is found:

$$\phi_{1o}=2\alpha-\phi_{1n} \quad (28)$$

Therefore, the phase $\phi_{1o}$ of the zero-phase-sequence voltage $e_{1o}$ is expressed by the following equation (29):

$$\phi_{1o}=2\omega t_s+2\tan^{-1}(e_{1qp}/e_{1dp})+\tan^{-1}(e_{1qn}/e_{1dn}) \quad (29)(S43)$$

The amplitude $E_{1om}$ of the zero-phase-sequence voltage $e_{1o}$ is expressed by the following, according to the negative-phase-sequence voltage ($e_{1dn}$, $e_{1qn}$):

$$E_{1om}=(e_{1dn}^2+e_{1qn}^2)^{1/2} \quad (30)$$

(S44)

Therefore, the zero-phase-sequence voltage $e_{1o}$ is expressed by the following:

$$e_{1o}=(e_{1dn}^2+e_{1qn}^2)^{1/2}\cdot\cos(\omega t+\phi_{1o}) \quad (31)$$

(S45)

Accordingly, the wye-phase voltages ($e_{1a}$, $e_{1b}$, $e_{1c}$) which are 120° out of phase with each other are expressed by the following equations (32) to (34):

$$e_{1a}=(e_{ab}-e_{ca})/3+(e_{1dn}^2+e_{1qn}^2)^{1/2}\cdot\cos(\omega t+\phi_{1o}) \quad (32)$$

$$e_{1b}=(e_{bc}-e_{ab})/3+(e_{1dn}^2+e_{1qn}^2)^{1/2}\cdot\cos(\omega t+\phi_{1o}) \quad (33)$$

$$e_{1c}=(e_{ca}-e_{bc})/3+(e_{1dn}^2+e_{1qn}^2)^{1/2}\cdot\cos(\omega t+\phi_{1o}) \quad (34)$$

Next, the zero-phase-sequence voltage is used to compensates for the unbalanced voltages and simultaneously the PFC control is performed (S5). Then, the wye-phase voltages ($e_{1a}$, $e_{1b}$, $e_{1c}$) are obtained, which are 120° out of phase with each other and on which the unbalanced voltage compensation and the power factor control have been performed (S6), and a control signal is generated for controlling the three-phase PWM converter based on the obtained wye-phase voltages ($e_{1a}$, $e_{1b}$, $e_{1c}$) (S7).

[Configuration Example of the Controller of Three-Phase Converter]

Next, with reference to FIG. 7, a more detailed configuration example will be explained regarding the unbalanced voltage compensator and the power factor and reactive power controller, provided in the controller of the three-phase converter according to the present invention.

Figure 7:
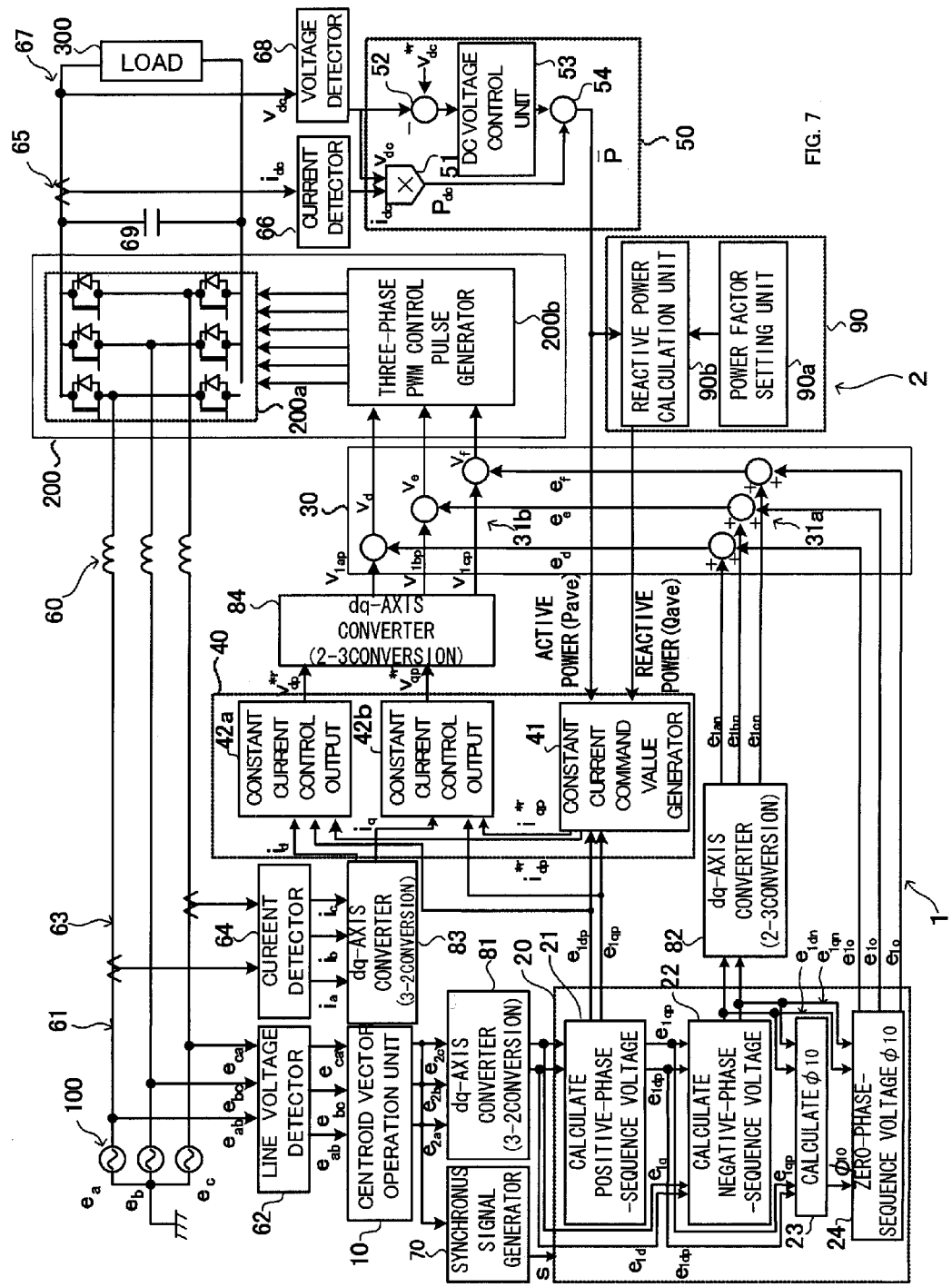
FIG. 7 illustrates a more detailed configuration example of the unbalanced voltage compensator and the power factor and reactive power controller according to the present invention.

In the configuration example of the unbalanced voltage compensator as shown in FIG. 7, similar to the schematic configuration as shown in FIG. 2, the three-phase AC power source 100 supplies the three-phase AC power to the three-phase converter 200 which subjects three-phase AC voltages of the three-phase AC power to the PWM conversion to obtain DC voltage, and outputs the DC voltage to the DC load 300.

The controller of the three-phase converter according to the present invention is provided with the following, as a configuration of the unbalanced voltage compensator 1 for compensating for unbalanced voltages; the centroid vector operation unit 10 for obtaining wye-phase voltages ($e_{2a}$, $e_{2b}$, $e_{2c}$) from each of the line voltages ($e_{ab}$, $e_{bc}$, $e_{ca}$) of the distribution line three-phase balanced voltages $e_a$, $e_b$, and $e_c$, the symmetrical coordinate component calculation unit 20 for calculating three-phase balanced system symmetrical component voltages ($e_{1dp}$, $e_{1qp}$, $e_{1dn}$, $e_{1qn}$) from the wye-phase voltages ($e_{2a}$, $e_{2b}$, $e_{2c}$) which are obtained in the centroid vector operation 10, and the constant current control unit 40 for forming a compensation signal for the unbalanced voltages.

The controller of the three-phase converter according to the present invention is provided with the following, as a configuration of the power factor and reactive power controller 2 for controlling the power factor and the reactive power; the average active power operation unit 50, the power factor and reactive power control unit 90, and the constant current control unit 40. Here, the constant current control unit 40 has a configuration commonly used for forming the compensation signal for the unbalanced voltages and a control signal for the power factor and the reactive power.

The output adder 30 adds the zero-phase-sequence voltage and the negative-phase voltage to the compensation signal and the control signal formed in the constant current control unit 40, and then, so that a PWM control signal for subjecting the three-phase AC voltages to the PWM conversion at the three-phase converter 200 is generated.

In addition, on the distribution line, the input side of the three-phase PWM converter 200 is provided with contact points 61 for detecting the line voltages, sensors 63 for measuring a current value, and AC reactors 60. Furthermore, the output side of the three-phase PWM converter 200 is provided with a contact point 67 for detecting DC voltage, a sensor 65 for measuring DC current, and a capacitor 69 for output smoothness.

On the input side of the three-phase PWM converter, the contact points 61 are connected to a line voltage detector 62, and the line voltage detector 62 measures the line voltages of the three-phase voltages. The sensors 63 are connected to a current detector 64, and the current detector 64 measures the current of the three-phase voltages.

In addition, on the output side of the three-phase PWM converter 200, a voltage detector 68 is connected to the contact point 67, and the voltage detector 68 measures the output voltage. In addition, the sensor 65 is connected to a current detector 66, and the current detector 66 measures the output current.

The three-phase AC power source outputs the three-phase input power, the voltage $V_a$, voltage $V_b$, and voltage $V_c$. The voltages $V_a$, $V_b$, and $V_c$ are respectively the phase voltages of the a-phase, b-phase, and c-phase. The contact points 61 have the points to establish contact respectively with the a-phase line, b-phase line, and c-phase line. The sensors 63 are installed respectively on the a-phase line and on the c-phase line, and those sensors detect AC input current inputted from the three-phase AC power source. The AC reactors 60 are respectively provided on the a-phase line, b-phase line, and c-phase line, so as to block high-frequency current.

The unbalanced voltage compensator 1 is provided with the dq-axis converters 81, 82, 83, and 84 for converting from three axes to two axes, or from two axes to three axes. The dq-axis converter 81 converts the wye-phase voltages ($e_{2a}$, $e_{2b}$, $e_{2c}$) obtained in the centroid vector operation unit 10 into the d-axis voltage $e_{1d}$ and the q-axis voltage $e_{1q}$, the dq-axis converter 82 converts the biaxial negative-phase-sequence voltages ($e_{1dn}$, $e_{1qn}$) into the triaxial negative-phase-sequence voltages ($e_{1an}$, $e_{1bn}$, $e_{1cn}$) the dq-axis converter 83 converts $i_a$, $i_b$, and $i_c$ obtained from the current detector 64 into the d-axis current $i_d$ and the q-axis current $i_q$, and the dq-axis converter 84 converts the biaxial positive-phase-sequence voltages ($v_{dp}^{*r}$, $v_{qp}^{*r}$) after the constant current control is performed, into the triaxial positive-phase-sequence voltages ($e_{1ap}$, $e_{1bp}$, $e_{1cp}$).

In addition, a synchronous signal generator 70 is connected to the centroid vector operation unit 10, and based on the wye-phase voltages ($e_{2a}$, $e_{2b}$, $e_{2c}$) obtained in the centroid vector operation unit 10, a synchronous signal "s" is generated to synchronize the dq-axis converters 81, 82, and 83.

The three-phase converter 200 is provided with a three-phase PWM circuit 200a, and a three-phase PWM pulse generator 200b for generating a pulse signal to control the operation of the three-phase PWM circuit 200a so as to perform the PWM control. The three-phase PWM pulse generator 200b forms the pulse signal based on the phase voltages ($V_d$, $V_e$, $V_f$) generated by the adder 30. The three-phase PWM circuit 200a may be formed of a bridge circuit, being made up of a switching element for instance, and the pulse signal controls ON/OFF operation of the switching element, thereby performing the PWM control.

For example, the three-phase PWM circuit 200a of the three-phase converter 200 may be made up of a semiconductor switching element such as an IGBT (Insulated Gate Bipolar Transistor) and a diode, and each gate of the semiconductor switching element is controlled ON and OFF, thereby converting the three-phase AC power being inputted into DC power and outputting the DC power.

The capacitor 69, the sensor 65, and the contact point 67 are provided on the output side of the three-phase converter 200. The capacitor 69 smoothes the DC voltage outputted from the three-phase converter 200. The sensor 65 is a current sensor for detecting the DC output current that is outputted from the three-phase converter 200 and a current detector 66 detects a current value $I_{dc}$ of the DC output current. The contact point 67 is a point to establish contact with the DC output line of the three-phase converter 200, and the voltage detector 68 detects a voltage value $V_{dc}$ of the DC output voltage.

Hereinafter, each unit of the unbalanced voltage compensator 1 will be explained.

The line voltage detector 62 detects line voltages ($e_{ab}$, $e_{bc}$, $e_{ca}$) of the three-phase AC input voltages at the contact podnts 61. The centroid vector operation unit 10 calculates and obtains the centroid vector voltages ($e_{2a}$, $e_{2b}$, $e_{2c}$) from the signals of the line voltages ($e_{ab}$, $e_{bc}$, $e_{ca}$) detected in the line voltage detector 62, and the obtained centroid vector voltages ($e_{2a}$, $e_{2b}$, $e_{2c}$) are used as substituting signals for the phase voltages ($e_{1a}$, $e_{1b}$, $e_{1c}$) which are 120° out of phase with each other.

The dq-axis converter (conversion from three-phase to two-phase) 81 converts the centroid vector voltages ($e_{2a}$, $e_{2b}$, $e_{2c}$) obtained in the centroid vector operation unit 10, into voltage signals ($e_{1d}$, $e_{1q}$) of the d-axis and q-axis (two phases). The synchronous signal generator 70 uses the centroid vector voltages ($e_{2a}$, $e_{2b}$, $e_{2c}$) obtained in the centroid vector operation unit 10 to generate the synchronous signal "s". The dq-axis conversion by the dq-axis converter 81 can be conducted based on the equation (21) as described above.

The current detector 64 acquires detection signals of the a-phase and c-phase AC input current, which are detected by the sensors 63, and generates signals ($i_a$, $i_b$, $i_c$) of the three-phase AC input current. The current detector 64 generates the three-phase AC input current signals by using that the total sum of the AC input current of the a-phase, b-phase, and c-phase becomes zero. Therefore, if it is configured such that at least two AC input currents out of the a-phase, b-phase, and c-phase are detected, input currents of the three phases can be acquired.

The dq-axis converter (conversion from three-phase to two-phase) 83 converts the three-phase AC input current signals ($i_a$, $i_b$, $i_c$) detected in the current detector 64 into a d-axis current signal and a q-axis current signal ($i_d$, $i_q$) (two phases).

The symmetrical coordinate component calculation unit 20 is provided with a positive-phase-sequence voltage calculator 21, a negative-phase-sequence voltage calculator 22, a $\phi_{1o}$ calculator 23, and a zero-phase-sequence voltage calculator 24, inputs the voltage signals ($e_{1d}$, $e_{1q}$) of the d-axis and q-axis (two phases) converted by the dq-axis converter 81 (conversion from three-phase to two-phase), and calculates the positive-phase-sequence voltages ($e_{1dp}$, $e_{1qp}$), the negative-phase-sequence voltages ($e_{1dn}$, $e_{1qn}$) and the zero-phase-sequence component voltage ($e_{1o}$), which are symmetrical component voltages.

In the aforementioned equation (21), in the d-axis voltage $e_{1d}$ and in the q-axis voltage $e_{1q}$ obtained by subjecting the centroid vector voltages ($e_{2a}$, $e_{2b}$, $e_{2c}$) to the dq-axis conversion, the DC components ($E_{1pm} \cos \alpha$, $E_{1pm} \sin \alpha$) are equivalent to the positive-phase-sequence voltages ($e_{1dp}$, $e_{1qp}$), the AC components ($E_{1nm} \cos(2\omega t+\phi_{1n})$, $-E_{1nm} \sin(2\omega t+\phi_{1n})$) are equivalent to the negative-phase-sequence voltages ($e_{1dn}$, $e_{1qn}$). Therefore, it is possible to extract the positive-phase-sequence voltages ($e_{1dp}$, $e_{1qp}$) and the negative-phase-sequence voltages ($e_{1dn}$, $e_{1qn}$) according to the frequency separation.

The positive-phase-sequence voltage calculator 21 is capable of extracting the positive-phase-sequence voltages ($e_{1dp}$, $e_{1qp}$) by using a band pass filter or a low pass filter. In addition, the negative-phase-sequence voltage calculator 22 subtracts from the original signals after the dq-axis conversion is performed, the positive-phase-sequence voltages ($e_{1dp}$, $e_{1qp}$) extracted in the positive-phase-sequence voltage calculator 21, thereby extracting the negative-phase-sequence voltages ($E_{1nm} \cos(2\omega t+\phi_{1n})$, $-E_{1nm} \sin((2\omega t+\phi_{1n}))$.

As described above, the zero-phase-sequence voltage $e_{1o}$ can be expressed by the equation (31), and the phase $\phi_{1o}$ of the zero-phase-sequence voltage $e_{10}$ is expressed by the equation (29). The amplitude $E_{1om}$ of the zero-phase-sequence voltage $e_{1o}$ is expressed by the equation (30).

Then, the $\phi_{1o}$ calculator 23 uses the positive-phase-sequence voltages ($e_{1dp}$, $e_{1qp}$) and the negative-phase-sequence voltages ($e_{1dn}$, $e_{1qn}$) to calculate the phase $\phi_{1o}$, and inputs the calculated phase $\phi_{1o}$ into the zero-phase-sequence voltage calculator 24. Then, the zero-phase-sequence voltage calculator 24 uses the phase $\phi_{1o}$ calculated by the $\phi_{1o}$ calculator 23 and the negative-phase-sequence voltages ($e_{1dn}$, $e_{1qn}$) calculated by the negative-phase-sequence voltage calculator 22, whereby the zero-phase-sequence voltage $e_{1o}$ is obtained.

The positive-phase-sequence voltages $e_{1dp}$, $e_{1qp}$) calculated by the positive-phase-sequence voltage calculator 21 are subjected to the constant current control in the constant current control unit 40, a command value for controlling the unbalanced voltage compensation and power factor (reactive power) is formed, and the two-to-three axis conversion in the dp converter 84 converts the voltages into the positive-phase-sequence voltages ($V_{1ap}$, $V_{1bp}$, $V_{1cp}$) respectively associated with the positive-phase-sequence voltages ($e_{1ap}$, $e_{1bp}$, $e_{1cp}$), and thereafter those voltages are inputted in the adder 30.

The negative-phase-sequence voltages ($e_{1dn}$, $e_{1qn}$) calculated in the negative-phase-sequence voltage calculator 22 are converted from two-axis to three-axis in the dq-axis converter 82, and after converted into the negative-phase-sequence voltages ($e_{1an}$, $e_{1bn}$, $e_{1cn}$), then inputted into the adder 30. The zero-phase-sequence voltage $e_{1o}$ calculated in the zero-phase-sequence voltage calculator 24 is inputted to the adder 30.

The adder 30 adds the inputted positive-phase-sequence voltages ($V_{1ap}$, $V_{1bp}$, $V_{1cp}$), the negative-phase-sequence voltages ($e_{1an}$, $e_{1bn}$, $e_{1cn}$), and the zero-phase-sequence voltage $e_{1o}$, and then outputs the phase voltages ($e_d$, $e_e$, $e_f$). These phase voltages ($e_d$, $e_e$, $e_f$) are signals after the unbalance compensation and the constant current control have been performed. The three-phase PWM control pulse generator

200b of the three-phase PWM converter 200 generates the pulse signal to control the three-phase PWM circuit 200a based on the phase voltages ($e_d$, $e_e$, $e_f$).

Hereinafter, an explanation will be made as to the configuration for the constant current control. In order to perform the constant current control of the three-phase PWM converter, it is necessary to know a relationship between the input power and the input voltage.

As shown in the following, space vector $I_a$ represents the a-phase current $i_a$ according to positive-phase-sequence current amplitude $I_{pm}$ and negative-phase-sequence current amplitude $I_{nm}$, and the equation below is established:

$$I_a = I_{pm} e^{j(\omega t+\beta)} + I_{nm} e^{-j(\omega t+\beta)} \tag{35}$$

On the other hand, the a-phase-sequence voltage $e_{1a}$ expressed by the equation (20) is converted into the space vector $V_{1a}$, and when the input power $P_{in}$ is obtained, the following equation is established:

$$P_{in} = P + jQ \tag{36}$$

$$= V_{1a} I_a^*$$

$$= \frac{3}{2} \{E_{1pm} e^{j(\omega t+\alpha)} + E_{1nm} e^{-j(\omega t+\phi_{1n})}\}\{I_{pm} e^{-j(\omega t+\beta)} + 1_{nm} e^{j(\omega t+\lambda_n)}\}$$

$$= \frac{3}{2} \{E_{1pm} I_{pm} e^{j(\alpha-\beta)} + E_{1nm} 1_{nm} e^{-j(\phi_{1n}-\lambda_n)} + E_{1pm} I_{nm} e^{j(2\omega t+\alpha+\lambda_n)} + E_{1nm} I_{pm} e^{-j(2\omega t+\phi_{1n}+\beta)}\}$$

After the zero-current control is performed, the negative-phase-sequence current $I_{nm}$ becomes zero ($I_{nm}=0$).

Under the condition that "$I_{nm}=0$", "P" and "Q" in the input power $P_{in}$ expressed by the equation (36) are further expressed as the following:

$$P = \frac{3}{2} \{v_{dp}^e i_{dp}^e + v_{qp}^e i_{qp}^e + \cos 2\omega t (v_{dn}^e i_{dp}^e + v_{qn}^e i_{qp}^e) + \sin 2\omega t (v_{qn}^e i_{dp}^e - v_{1dn}^e i_{qp}^e)\} \tag{37}$$

$$Q = \frac{3}{2} \{v_{qp}^e i_{dp}^e - v_{dp}^e i_{qp}^e + \cos 2\omega t (v_{qn}^e i_{dp}^e - v_{dn}^e i_{qp}^e) - \sin 2\omega t (v_{dn}^e i_{dp}^e + v_{qn}^e i_{qp}^e)\} \tag{38}$$

Here, the following is to be noted:

$$\left.\begin{array}{ll} v_{dp}^e = E_{1pm} \cos\alpha, & v_{qp}^e = E_{1pm} \sin\alpha \\ v_{dn}^e = E_{1nm} \cos\phi_{1n}, & v_{qn}^e = -E_{1nm} \sin\phi_{1n} \\ i_{dp}^e = I_{pm} \cos\beta, & i_{qp}^e = I_{pm} \sin\beta \end{array}\right\} \tag{39}$$

As for $P_{in}$ in the equation (36), when the average value power control and the zero control of the negative-phase-sequence current are performed, the term "$2\omega t$" in the equations (37) and (38) can be eliminated. If the average active power of P is assumed as "$P_{ave}$", and the average reactive power of Q is assumed as "$Q_{ave}$" the following equation is obtained:

$$\begin{bmatrix} P_{ave} \\ Q_{ave} \end{bmatrix} = \frac{3}{2} \begin{bmatrix} v_{dp}^e & v_{qp}^e \\ v_{qp}^e & -v_{dp}^e \end{bmatrix} \begin{bmatrix} i_{dp}^e \\ i_{qp}^e \end{bmatrix} \tag{40}$$

On the other hand, the average active power $P_{ave}$ of $P_{in}$ according to the PI control is given as the following equation, when a voltage command value is assumed as $V_{dc}^{*r}$.

$$P_{ave} = \left(k_{pv} + \frac{k_{iv}}{s}\right)(v_{dc}^{*r} - v_{dc}) + v_{dc} i_{dc} \tag{41}$$

The average active power operation unit 50 as shown in FIG. 7 indicates a configuration example which executes the PI control of the equation (41) as described above.

As for the current command value for controlling the average active power $P_{ave}$ and the average reactive power $Q_{ave}$ in the equation (40), $i_{dp}^{*r}$ and $i_{qp}^{*r}$ substitute for the current terms respectively in the equation (40), and the following equation is established:

$$\begin{bmatrix} i_{dp}^{*r} \\ i_{qp}^{*r} \end{bmatrix} = \frac{2}{3(v_{dp}^{e2} + v_{qp}^{e2})} \begin{bmatrix} v_{dp}^e & v_{qp}^e \\ v_{qp}^e & -v_{dp}^e \end{bmatrix} \begin{bmatrix} P_{ave} \\ Q_{ave} \end{bmatrix} \tag{42}$$

As for the current command value for performing the zero control on $Q_{ave}$ in the equation (40), $i_{dp}^{*r}$ and $i_{qp}^{*r}$ substitute for the current terms respectively in the equation (40), and the following equation is established:

$$\begin{bmatrix} i_{dp}^{*r} \\ i_{qp}^{*r} \end{bmatrix} = \frac{2}{3(v_{dp}^{e2} + v_{qp}^{e2})} \begin{bmatrix} v_{dp}^e & v_{qp}^e \\ v_{qp}^e & -v_{dp}^e \end{bmatrix} \begin{bmatrix} P_{ave} \\ 0 \end{bmatrix} \tag{43}$$

Those equations (42) and (43) described above express current command values that are determined by the positive-phase-sequence voltage of the three-phase AC and the power of the three-phase converter. The output signals $v_{dp}^{*r}$ and $v_{qp}^{*r}$ according to the constant current control using the current command values, are given as shown in the following:

$$v_{dp}^{*r} = -\left(k_p + \frac{k_i}{s}\right)(i_{dp}^{*r} - i_d) + \omega L i_q + e_{dp} \tag{44}$$

$$v_{qp}^{*r} = -\left(k_p + \frac{k_i}{s}\right)(i_{qp}^{*r} - i_q) - \omega L i_d + e_{qp} \tag{45}$$

The current detector 66 acquires a detection signal of the DC output current that is detected by the sensor 65, and generates a DC output current signal $i_{dc}$. The voltage detector 68 detects a DC output voltage at the contact point 67, and generates a DC output voltage signal $v_{dc}$.

The average active power operation unit 50 is provided with a multiplier 51, a subtractor 52, a DC voltage control unit 53, and an adder 54.

The subtractor 52 subtracts the DC output voltage signal $v_{dc}$ detected by the voltage detector 68, from a DC voltage command value signal $v_{dc}^{*r}$ which indicates a certain constant voltage value set as the voltage command value, and outputs a deviation signal being obtained. The multiplier 51 multiplies the DC output current signal $i_{dc}$ detected by the current detector 66, by the DC output voltage signal $v_{dc}$ detected by the voltage detector 68, and calculates an instantaneous power signal $P_{dc}$.

The DC voltage control unit 53 generates a DC voltage control signal as a result of the PI (Proportional Integral) control which controls the DC output voltage signal $v_{dc}$ to be a constant voltage value, based on the deviation signal calculated by the subtractor 52. The adder 54 adds the instantaneous power signal $P_{dc}$ calculated by the multiplier 51 to the DC voltage control signal generated by the DC voltage control unit 53, thereby generating the average active power signal $P_{ave}$.

The power factor and reactive power control unit 90 is provided with a power factor setting unit 90a for arbitrarily setting the power factor, and an average reactive power operation unit 90b for calculating the reactive power.

The power factor setting unit 90a inputs a set power factor via an input means or a control means, not illustrated. The average reactive power operation unit 90b calculates average reactive power $Q_{ave}$, on the basis of the average active power $P_{ave}$ acquired in the average active power operation unit 50 and the set power factor (case) set in the power factor setting unit 90a.

The power factor $\cos\theta$ is defined by $[P_{ave}/(P_{ave}^2+Q_{ave}^2)^{1/2}]$. The power factor and reactive power controller 2 of the present invention calculates the average reactive power $Q_{ave}$ according to the following equation, using the power factor $\cos\theta$ set in the power factor setting unit 90a and the average active power $P_{ave}$ acquired in the average active power operation unit 50:

$$Q_{ave} = P_{ave} \cdot [1-(\cos\theta)^2]^{1/2}/\cos\theta$$

According to the relationship among the power factor $\cos\theta$, the average active power $P_{ave}$, and the average reactive power $Q_{ave}$, the power factor and reactive power control unit 90 controls the power factor to be an arbitrary value, and controls the average reactive power in accordance with the set power factor.

The constant current control unit 40 is provided with a constant current command value generator 41 for generating current command values, and constant current control output units 42a and 42b for generating output signals which have been subjected to the constant current control based on the current command values. The constant current control output unit 42a generates a d-axis output signal $v_{dp}^{*r}$, and the constant current control output unit 42b generates a q-axis output signal $v_{qp}^{*r}$.

The constant current control unit 40 obtains the current command values, on the basis of the average active power $P_{ave}$ obtained in the average active power operation unit 50 and the average reactive power $Q_{ave}$ obtained in the average reactive power operation unit 90b. Then, the constant current control unit 40 compares thus obtained current command values and the input side current detected in the current detection unit 64, thereby performing constant current control on the positive-phase-sequence voltage acquired from the positive-phase-sequence voltage calculator 21, and control values $(V_{dp}^{*r}, V_{qp}^{*r})$ are obtained. After the dq-axis converter 84 converts the obtained control values $(V_{dp}^{*r}, V_{qp}^{*r})$ into three-axis positive phase signals $(V_{1ap}, V_{1bp}, V_{1cp})$ those signals are inputted into the adder 30.

The constant current command value generator 41 generates signals $(i_{dp}^{*r}, i_{qp}^{*r})$ of the current command values according to a computation, based on the signal of the average active power $P_{ave}$ calculated in the adder 54, and positive-phase-sequence components $(e_{1dp}, e_{1qp})$ of the d-axis and q-axis voltage signals which are separated by the positive-phase-sequence voltage calculator 21.

The constant current control output unit 42a performs the constant current control based on $i_d$ from the dq-axis converter 83 and the current command value signal $i_{dp}^{*r}$, and generates the d-axis output signal $v_{dp}^{*r}$. The constant current control output unit 42b performs the constant current control based on the $i_q$ from the dq-axis converter 83 and the current command value signal $i_{qp}^{*r}$, and generates the q-axis output signal $v_{qp}^{*r}$. The constant current control is performed according to the PI control, which controls the input current to be a constant current value.

The three-phase PWM control pulse generator 200b assumes the signals $(V_d, V_e, V_f)$ calculated by the adding part 31b of the adder 30 as gate control signals, compares those signals with triangle wave signals generated by a carrier frequency generator (not illustrated), generates a gate pulse signal as the PWM signal, and outputs the signal to each of the gates of the semiconductor switching elements in the three-phase PWM circuit 200a.

[Operation Example of the Unbalanced Voltage Compensator and the Power Factor and Reactive Power Controller]

Next, an operation example of the unbalanced voltage compensator 1 and the power factor and reactive power controller 2 will be explained. The centroid vector operation unit 10 calculates the centroid vector voltages $(e_{2a}, e_{2b}, e_{2c})$ from the line voltages $(e_{ab}, e_{bc}, e_{ca})$, and the dq-axis converter 81 converts the centroid vector voltages $(e_{2a}, e_{2b}, e_{2c})$ being calculated into the d-axis voltage signal $e_{1d}$ and the q-axis voltage signal $e_{1q}$ as expressed in the equation (21).

The first term on the right-hand side of the equation (21) expresses the positive-phase-sequence components $e_{1dp}, e_{1qp}$ of the d-axis and q-axis voltage signals $e_{1d}, e_{1q}$, and the second term on the right-hand side expresses the negative-phase-sequence components $e_{1dn}, e_{1qn}$ of the d-axis and q-axis voltage signals $e_{1d}, e_{1q}$. Therefore, it is possible to separate the d-axis and q-axis voltage signals $e_{1d}$ and $e_{1q}$ according to the frequency separation by using a filter or the like, between the positive-phase and the negative-phase; i.e., between the positive-phase-sequence components $e_{1dn}, e_{1qn}$ and the negative-phase-sequence components $e_{1dn}, e_{1qgn}$. The positive-phase-sequence voltage calculator 21 and the negative-phase-sequence voltage calculator 22 perform the separation between the positive phase and the negative phase. The dq-axis converter 82 converts the negative-phase-sequence components $e_{1dn}, e_{1qn}$ of the d-axis and q-axis voltage signals $e_{1d}, e_{1q}$ having been separated between the positive-phase and the negative-phase, into phase voltage signals $(e_{1an}, e_{1bn}, e_{1cn})$ of the three-phase negative-phase-sequence components.

On the other hand, the zero-phase-sequence voltage calculator 24 calculates the zero-phase-sequence voltage $e_{1o}$, by using signal values of the positive-phase-sequence voltage and the negative-phase-sequence voltage being calculated.

As to the input power, the average active power $P_{ave}$ and the average reactive power $Q_{ave}$ are expressed by the equation (40), using the positive-phase-sequence components $v_{dp}^e$, $v_{qp}^e$ of the d-axis and q-axis voltage signals $v_d, v_q$, and input command current signals $i_{dp}^e, i_{qp}^e$.

The current detector 66 detects the DC output current signal $i_{dc}$ via the sensor 65. The voltage detector 68 detects the DC output voltage signal $v_{dc}$ via the contact point 67. The multiplier 51 multiplies the DC output current signal $i_{dc}$ by the DC output voltage signal $v_{dc}$, and outputs the DC output power signal $P_{dc}$. The subtractor 52 subtracts the DC output voltage signal $v_{dc}$ from the DC voltage command value signal $v_{dc}^{*r}$, and generates a deviation signal. With regard to the deviation signal between the DC voltage command value signal $v_{dc}^{*r}$ and the DC output voltage signal $v_{dc}$, the DC voltage control unit 53 performs the PI control, so that the DC output voltage signal $V_{dc}$ becomes a constant voltage value, and then, generates a DC voltage control signal.

The adder 54 adds the DC voltage control signal outputted from the DC voltage control unit 53 to the DC output power signal $P_{dc}$, thereby outputting the average active power $P_{ave}$. As expressed by the equation (41), the average active power $P_{ave}$ ave is obtained by adding the DC voltage control signal obtained by the PI control over the deviation signal between the DC voltage command value signal $V_{dc}^{*r}$ and the DC output voltage signal $v_{dc}$, to the DC output power signal $P_{dc}$ ($=v_{dc}\cdot i_{dc}$).

The constant current command value generator 41 generates and outputs the input command current signals $i_{dp}^{*r}$ and $i_{qp}^{*r}$, according to the equation (42), based on the average active power $P_{ave}$ the average reactive power $Q_{ave}$, and the positive-phase-sequence components $e_{1dp}$, $e_{1qp}$, of the d-axis and q-axis voltage signals, which are calculated in the positive-phase-sequence voltage calculator 21.

When the power factor is set to be 1, the average reactive power $Q_{ave}$ becomes zero. Therefore, the input command current signals $i_{dp}^{*r}$ and $i_{qp}^{*r}$ are generated according to the equation (43).

On the input current side of the constant current control, the current detector 64 detects via the sensors 63, three-phase AC input current signals $i_a$, $i_b$, $i_c$ of the three-phase AC power being outputted from the three-phase AC power source 100.

The dq-axis converter 83 (conversion from three-phase to two-phase) converts the three-phase AC input current signals $i_a$, $i_b$, and $i_c$, into the d-axis current signal $i_d$ and the q-axis current signal $i_q$.

The d-axis and q-axis constant current output units 42a and 42b input the d-axis current signal $i_d$ and the q-axis current signal $i_q$, respectively, as the feedback values of the input current. The constant current control output units 42a and 42b further input from the constant current command value generator 41, the positive-phase-sequence current command value signal of the d-axis $i_{dp}^{*r}$ and the positive-phase-sequence current command value signal of the q-axis $i_{qp}^{*r}$, and according to a predetermined computation based on deviation signals between the d-axis and q-axis current signals $i_d$ and $i_q$, and the current command value signals $i_{dp}^{*r}$ and $i_{qp}^{*r}$, generate and output control signals $V_{dp}^{*r}$ and $V_{qp}^{*r}$ for controlling the input current to be a constant current value.

It is to be noted that the d-axis control performed by the constant current control output unit 42a is expressed by the equation (44), and the q-axis control performed by the constant current control output unit 42b is expressed by the equation (45).

The dq-axis converter 84 converts the control values $V_{dp}^{*r}$ and $V_{qp}^{*r}$ into triaxial positive-phase signals ($V_{1ap}$, $V_{1bp}$, $V_{1cp}$), and thereafter inputs the converted signals in the adder 30.

In the adder 30, the adding part 31a adds the zero-phase-sequence voltage $e_{1o}$ calculated in the zero-phase-sequence voltage calculator 24, to the phase voltage signals ($e_{1an}$, $e_{1bn}$, $e_{1cn}$) of the negative-phase-sequence components obtained by the conversion in the dq-axis converter 82. The adding part 31b further adds the positive-phase-sequence components of the phase voltage signals ($V_{1ap}$, $V_{1bp}$, $V_{1cp}$) obtained by the conversion in the dq-axis converter 84, to the signals obtained by adding the phase voltage signals ($e_{1an}$, $e_{1bn}$, $e_{1cn}$) to the zero-phase-sequence voltage $e_{1o}$ calculated in the adding part 31a, generates three-phase voltage signals ($V_d$, $V_e$, $V_f$), and outputs the generated signals to the three-phase PWM control pulse generator 200b.

The three-phase PWM control pulse generator 200b generates a gate control signal for controlling the three-phase PWM circuit 200a based on the three-phase voltage signals ($V_d$, $V_e$, $V_f$), compares the generated signal with a triangle wave signal generated from a carrier frequency generator (not illustrated), generates the gate pulse signal by the PWM (Pulse Width Modulation) conversion, and outputs the gate pulse signal to each of the gates of the semiconductor switching elements of the three-phase PWM circuit 200a so as to perform ON/OFF control on each of the gates.

Next, operations of the unbalanced voltage compensator 1 in the balanced state and in the unbalanced state will be explained. It is to be noted here that the unbalanced state includes the state where the voltage is reduced within a short period (instantaneous voltage drop), and further it includes the state where unbalance occurs in the three-phase voltages for a long period of time. Here, it is assumed that the load amount of the DC load 300 is constant.

[Operations in the Balanced State]

Figure 17:
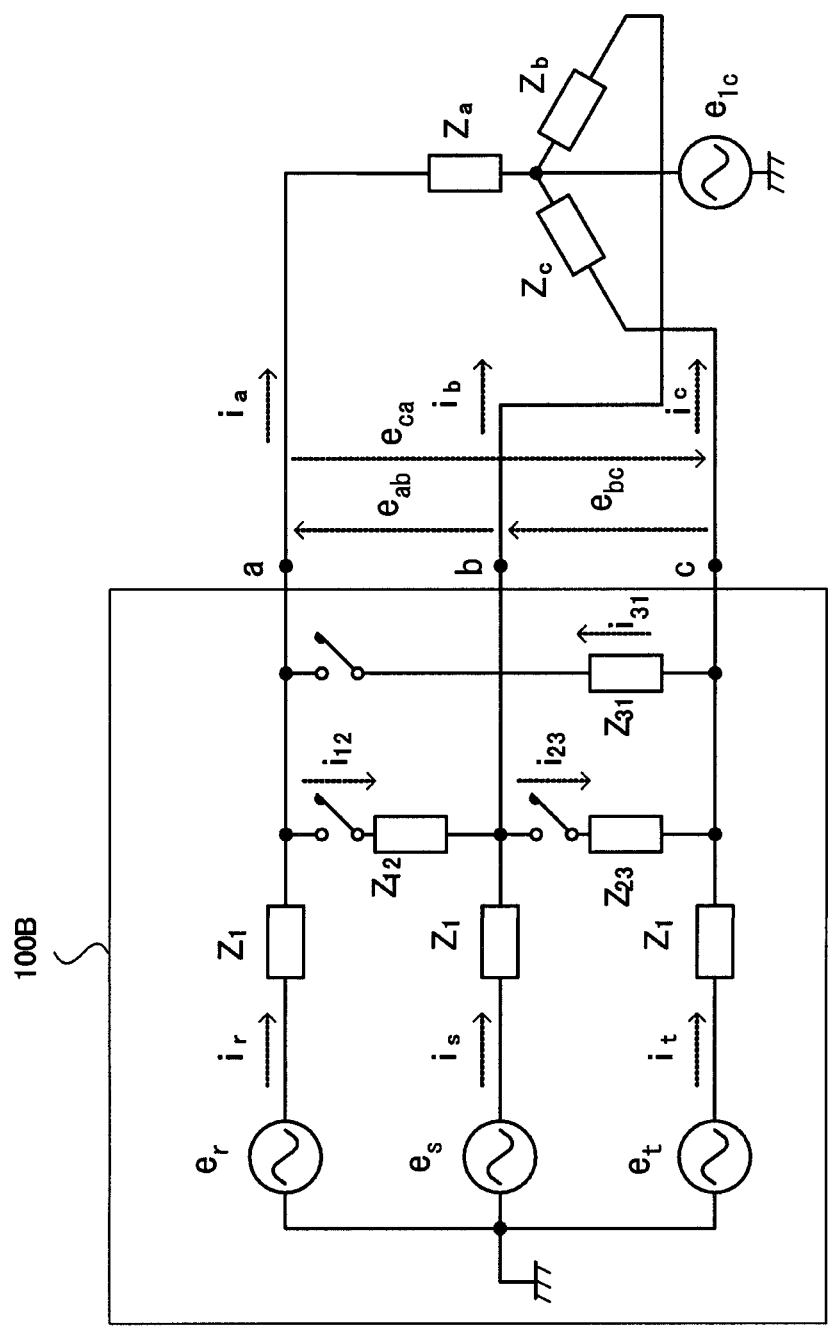
FIG. 17 illustrates an equivalent circuit in the event of voltage sag.
Figure 18:
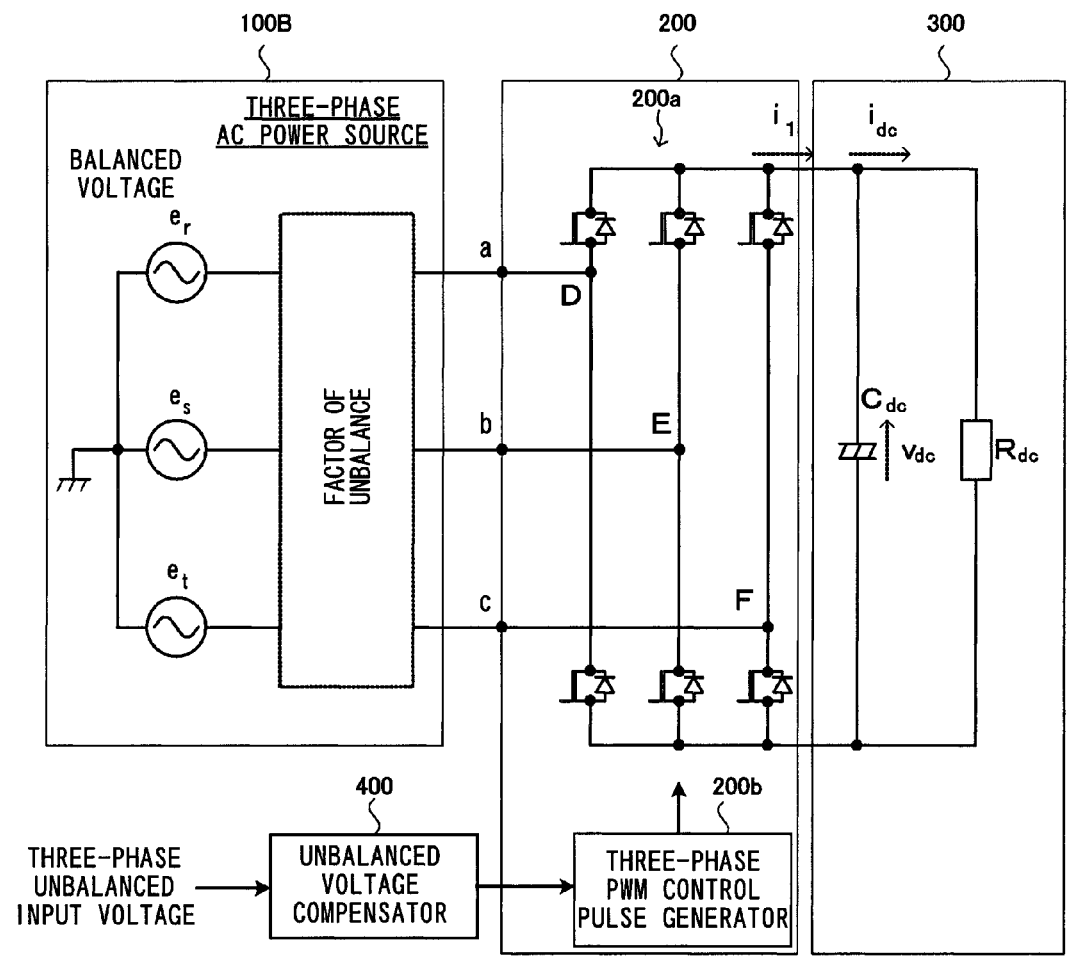
FIG. 18 illustrates equivalent circuits, respectively on the input side and on the load side of the three-phase converter.

In the state before the instantaneous voltage drop occurs, the three-phase AC input voltages from the three-phase AC power source 100 are in the state of being balanced. In this balanced state, as shown in FIG. 17, the three-phase voltage signals $e_r$, $e_s$, $e_t$ correspond to the positive-phase-sequence voltage $e_{1p}$ only, and at this time, the d-axis voltage signal $e_{1d}$ expressed in the equation (21) becomes $E_{1pm}$, and the q-axis voltage signal $e_{1q}$ becomes zero. Here, since $Z_{12}$, $Z_{23}$, and $Z_{31}$ are open, the phase delay due to $Z_{12}$ is ignorable. Therefore, it can be determined that the equations (1), (2), and (3) correspond to the equation (17), and $\alpha=0$ is established.

On this occasion, the signals $i_{dp}^{*r}$, $i_{qp}^{*r}$ of the current command values are expressed as the following according to the equation (42):

$$i_{dp}^{*r}=(2/3)\cdot(P_{ave}/E_{1pm}) \qquad (47)$$

$$i_{qp}^{*r}=(2/3)\cdot(-Q_{ave}/E_{1pm}) \qquad (48)$$

According to the aforementioned command value current signals $i_{dp}^{*r}$ and $i_{qp}^{*r}$, current control is performed from the constant current command value generator 41 in such a manner that the input power factor becomes the set power factor. In the case where the set power factor is "1", the command value current signal $i_{qp}^{*r}$ becomes zero, and current control is performed from the constant current command value generator 41 so that the input power factor becomes "1".

Furthermore, the DC voltage control unit 53 controls the DC output voltage to be a constant value, and therefore, constant DC power is outputted regularly to the DC load 300 side.

[Operations in the Unbalanced State]

Next, an explanation will be made regarding the unbalanced state where at least one-phase AC input voltage out of the three-phase AC input voltages from the three-phase AC power source 100 becomes the state of instantaneous voltage drop, and the AC input voltages become unbalanced.

When the instantaneous voltage drop occurs in the AC input voltages, the positive-phase-sequence voltage calculator 21 of the symmetrical coordinate component calculation unit 20 outputs the positive-phase-sequence components $e_{1dp}$, $e_{1qp}$ of the d-axis and the q-axis voltage signals, the negative-phase-sequence voltage calculator 22 outputs the negative-phase-sequence components $e_{1dn}$, $e_{1qn}$ of the d-axis and the q-axis voltage signals, and the zero-phase-sequence voltage calculator 24 outputs the zero-phase-sequence component $e_{1o}$.

The constant current control output units 42a and 42b add the positive-phase-sequence components $e_{1dp}$, $e_{1qp}$ of the d-axis and the q-axis voltage signals to the current command value signals. The negative-phase-sequence components $e_{1dn}$, $e_{1qn}$ of the d-axis and q-axis voltage signals are further added via the adding parts 31a and 31b, to generate the output signals ($V_d$, $V_e$, $V_f$), and the current control is performed from the constant current command value generator 41 so that the input power factor becomes "1". In addition, the DC voltage control unit 53 controls the DC output voltage to be a constant value, whereby the constant DC power is outputted regularly on the DC load 300 side.

By adding the zero-phase-sequence component $e_{1o}$ to the negative-phase-sequence component and the positive-phase-sequence component, the zero-phase-sequence component of the power source voltage is superimposed on the output signals ($V_d$, $V_e$, $V_f$), and a control signal for the three-phase PWM converter is generated based on the output signals on which the zero-phase-sequence component is superimposed, allowing the three-phase AC input voltages to compensate for the instantaneous voltage drop.

The present invention subjects the vector operation to the line voltages acquired at one measurement point of time, thereby acquiring the phase voltages of three phases as described above, performs the constant current control according to the PFC control based on the positive-phase-sequence voltage and the negative-phase-sequence voltage of the phase voltages, further calculating the zero-phase-sequence voltage from the phase voltages, and superimposing the zero-phase-sequence voltage on the positive-phase-sequence voltage and the negative-phase-sequence voltage, thereby compensating for the unbalance.

In the unbalanced voltage compensation according to the present invention, the line voltages acquired at one measurement point of time are used as original signals for calculating the zero-phase-sequence voltage. With this configuration, it is possible to acquire a control signal for compensating for the unbalance, from the measurement value acquired at one measurement point of time.

Typically, for detecting voltage fluctuations of the phase voltage, at least a half cycle of time interval is necessary. Therefore, a measured value at just one measurement point of time is not enough for detecting and compensating for the unbalanced state, and measured values obtained at multiple measurement points of time are required. On the other hand, in the present invention, the line voltages acquired at one measurement point of time are subjected to the vector operation, thereby obtaining the positive-phase-sequence voltage and the negative-phase-sequence voltage of the phase voltages, and the zero-phase-sequence voltage can be calculated from the positive-phase-sequence voltage and the negative-phase-sequence voltage. Accordingly, it is possible to generate a signal for compensating for the unbalance, from only the values acquired at one measurement point of time.

The acquisition of the line voltages and the unbalanced voltage compensation based on the acquired line voltages are not limitedly based on the values acquired at one measurement point of time. Alternatively, the acquisition of the line voltages and the unbalance compensation are sequentially repeated, thereby not only compensating for the instantaneous voltage drop, but also compensating for the unbalanced state of the voltages for a long term.

Next, with reference to FIG. 8 and FIG. 9, a configuration example of the present invention will be explained as to the unbalanced voltage compensation in which the unbalanced voltage compensating operation is performed by an arithmetic processing by the CPU according to software.

The unbalanced voltage compensator 1 of the present invention is able to implement the functions of instantaneous voltage drop compensation and the power conversion, by means of the circuit configuration. Alternatively, it is able to implement the functions of instantaneous voltage drop compensation and the power conversion by allowing the CPU to execute a program.

Figure 8:
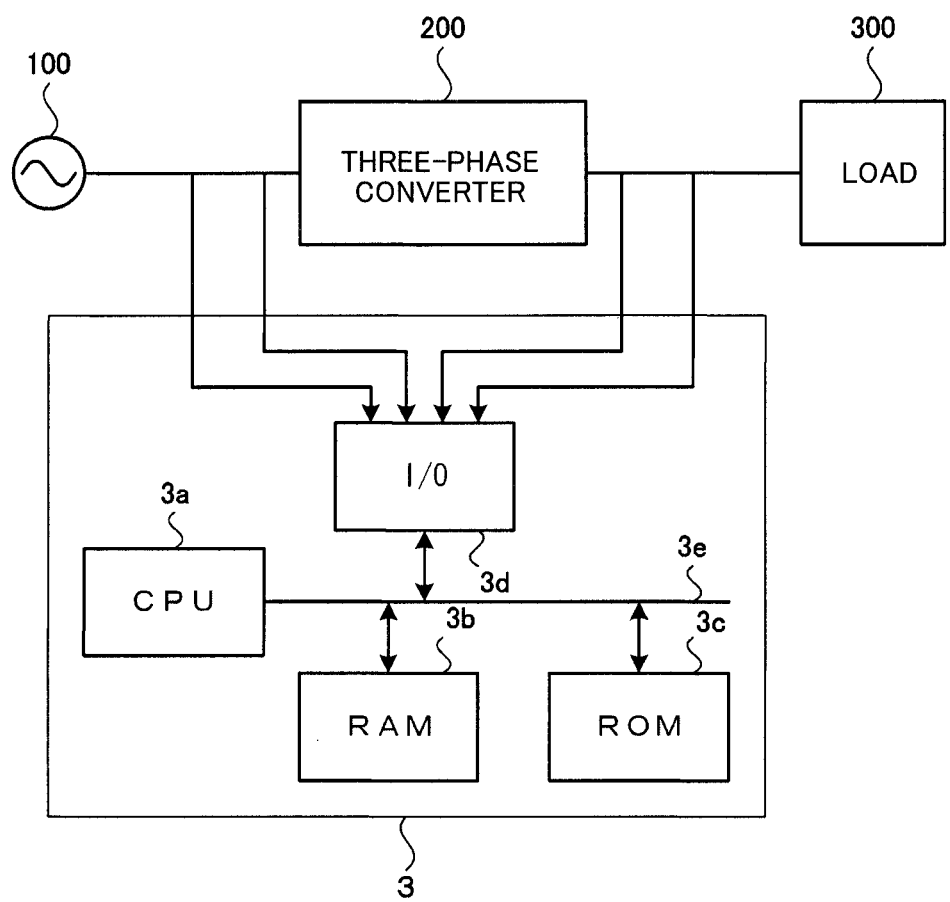
FIG. 8 illustrates a configuration example to explain that the unbalanced voltage compensating operation and the power factor control operation of the present invention are performed by an arithmetic processing of the CPU according to software.

FIG. 8 illustrates a configuration example in the case where the unbalanced voltage compensator and the power factor and the reactive power controller of the present invention are implemented by the CPU and software. Hereinafter, the configuration of the computer control unit according to the CPU and software will be explained, labeled by the reference numeral 3.

As shown in FIG. 8, in the three-phase AC power supplied from the three-phase AC power source 100, the three-phase PWM converter 200 subjects the three-phase AC voltages to the PWM conversion and outputs DC voltage to the DC load 300. The computer control unit 3 has functions of the unbalanced voltage compensation and the power factor and reactive power control, and controls the three-phase converter 200 to perform power conversion, unbalanced voltage compensation, and power factor and reactive power control.

The computer control unit 3 is provided with the CPU (Central Processing Unit) 3a, RAM (Random Access Memory) 3b, ROM (Read Only Memory) 3c, and I/O unit 3d, and each of the elements are connected via a bus 3e.

The CPU 3a conducts centralized control over each of the elements of the computer control unit 3. The CPU 3a extracts a designated program in the RAM 3b, out of system programs and various application programs stored in the ROM 3c, and executes various processing in cooperation with the program being extracted in the RAM 3b.

The CPU 3a controls the three-phase PWM pulse generator provided in the three-phase converter 200 in cooperation with the power conversion control program, thereby converting the three-phase AC input power inputted from the three-phase AC power source 100 into DC output power, compensating for the unbalanced voltages of the AC input voltage, and performing power factor and reactive power control.

The RAM 3b is a volatile-type memory for storing various information items, and has a work area to extract various data and programs. The ROM 3c is a memory for storing various information items in readable manner, and stores the power conversion control program for controlling the three-phase converter.

The I/O unit 3d handles inputting and outputting of various signals with the three-phase converter 200. The I/O unit 3d inputs the line voltages and the a-phase and c-phase AC input current on the three-phase AC input side, as well as the DC output current and the DC output voltage on the DC output side. The I/O unit 3d further outputs the gate pulse signals for controlling semiconductor-switching elements of the three-phase bridge circuit in the three-phase converter 200.

Next, with reference to FIG. 9, an explanation will be made as to the operations according to the program control by the computer control unit 3.

In the computer control unit 3, for example, outputting of the three-phase AC power from the three-phase AC power source 100 triggers reading of the power conversion control program from the ROM 3c and extracting the program in the RAM 3b, and then processing for the power conversion control and unbalanced voltage compensation is executed in cooperation with the CPU 3a.

Figure 9:
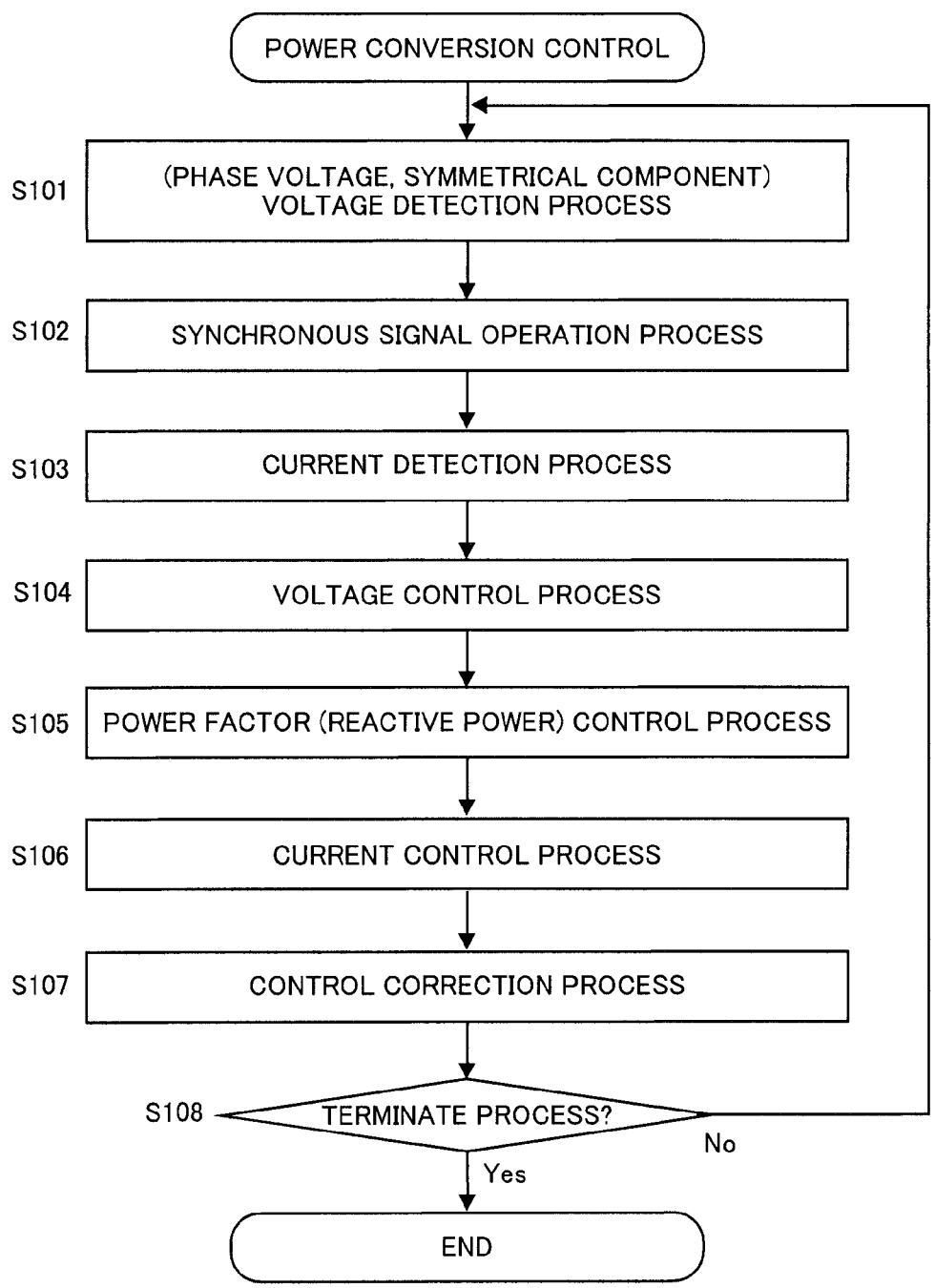
FIG. 9 is a flowchart to explain a configuration example where the unbalanced voltage compensating operation and the power factor control operation of the present invention are performed by an arithmetic processing of the CPU according to software.

As shown in the flowchart in FIG. 9, firstly the voltage detecting process is performed (S101). In the step of S101, three-phase AC voltages are acquired via the I/O unit 3d, line voltage signals $e_{ab}$, $e_{bc}$, $e_{ca}$ of the three-phase AC voltages being acquired are detected, and then phase voltage signals $e_{2a}$, $e_{2b}$, $e_{2c}$ are calculated according to the centroid vector operation. In the configuration example as shown in FIG. 7, for example, the centroid vector operation is performed in the centroid vector operation unit 10.

The phase voltage signals $e_{2a}$, $e_{2b}$, $e_{2c}$ of three phases being calculated are converted into the d-axis voltage signal $e_{1d}$ and the q-axis voltage signal $e_{1q}$, being two phases. The positive-phase-sequence components $e_{1dp}$, $e_{1qp}$ and the negative-phase-sequence components $e_{1dn}$, $e_{1qn}$ are separated and obtained from the d-axis and q-axis voltage signals $e_{1d}$, $e_{1q}$ being converted. Then, the negative-phase-sequence components $e_{idn}$, $e_{1qn}$ of the d-axis and q-axis voltage signals $e_{1d}$, $e_{1q}$, are converted into the phase voltage signals $e_{1an}$, $e_{1bn}$, $e_{1cn}$ in three phases. The processes in the step of S101 correspond to the processes performed in the line voltage detector 62, the centroid vector operation unit 10, the dq-axis converter 81, the positive-phase-sequence voltage calculator 21, the negative-phase-sequence voltage calculator 22, the phase $\phi_o$ calculator 23 for calculating the zero phase $\phi_o$, and the zero-phase-sequence voltage calculator 24.

Each of the processes in step S101 may be performed in parallel as appropriate. Such parallel processing as performed in step S101 may also be applicable in the same manner, to the following steps S102 to S106.

In the step of S102, a synchronous calculation process is performed. A synchronous signal "s" is generated from the phase signals $e_{2a}$, $e_{2b}$, and $e_{2c}$ in three phases. The synchronous signal "s" may be obtained from the zero cross point of any of the phase voltages of the phase voltage signals $e_{2a}$, $e_{2b}$, and $e_{2c}$, for instance. The synchronous signal can be generated by comparing the phase voltage with the zero voltage, and outputting the synchronous signal "s" at the point when the phase voltage becomes equal to the zero voltage. In the configuration example as shown in FIG. 7, the synchronous signal generator 70 is allowed to generate the signal by using the output signals ($e_{2a}$, $e_{2b}$, $e_{2c}$) from the centroid vector operation unit 10, and it is possible to configure this operation by a comparison circuit which compares the output signal $e_{2a}$ with the zero voltage, for instance. Alternatively, the synchronous signal may be generated at an arbitrary point of time and this synchronous signal can be assumed as an initial value of the synchronous signal "s".

The synchronous signal "s" is used for synchronization in the dq-axis conversion including the two-phase to three-phase conversion and three-phase to two-phase conversion in each of the steps S101, S103, and S106. On this occasion, the synchronization is performed by using the synchronous signal "s" obtained in the step S102 executed just before, or the synchronous signal "s" being the initial value. Therefore, the step of S102 corresponds to the process performed in the synchronous signal generator 70.

Next, a current detection process is performed in the step of S103. In the step of S103, three-phase AC input current signals $i_a$, $i_b$, $i_c$ being inputted via the I/O unit 3d are detected, and converted into the d-axis current signal $i_d$, and the q-axis current signal $i_q$. The step of S103 corresponds to the processes performed in the current detector 64 and in the dq-axis converter 83.

Next, a voltage control process is performed in the step S104. In the step of S104, the DC output current signal $i_{dc}$ and the DC output voltage signal $v_{dc}$ are detected via the I/O unit 3d. The detected DC output current signal $i_{dc}$ is multiplied by the detected DC output voltage signal $v_{dc}$, thereby calculating the DC output power signal $P_{dc}$. The DC output voltage signal $v_{dc}$ is subtracted from the DC voltage command value signal $V_{dc}{*}^r$, calculating a deviation signal, and a DC voltage control signal for controlling the DC output voltage signal $v_{dc}$ to be a constant voltage value is generated based on the deviation signal being calculated. Then, the DC voltage control signal is added to the DC output power signal $P_{dc}$ to generate the average active power $P_{ave}$. The step of S104 corresponds to the processes performed in the current detector 66, the voltage detector 68, the subtractor 52, the multiplier 51, the DC voltage control unit 53, and the adder 54.

Next, the power factor and reactive power control process is performed in the step S105. In the step of S105, the power factor setting unit 90 sets the power factor, and the average reactive power operation unit 90b calculates the average reactive power $Q_{ave}$, according to the power factor set in the power factor setting unit 90a and the average active power $P_{ave}$ obtained in the average active power operation unit 50.

Next, a current control process is performed in the step S106. In the step of S106, the current command value signals $i_{1dp}{*}^r$, $i_{1dp}{*}^r$ are generated, on the basis of the average active power $P_{ave}$ obtained in the step S104, the average reactive power $Q_{ave}$ obtained in the step S105, and the positive-phase-sequence components $e_{dp}$, $e_{qp}$, of the voltage signals respectively of d-axis and q-axis obtained by the positive-phase negative-phase separation in the step of S101. The current command value signals $i_{1dp}{*}^r$, $i_{1qp}{*}^r$ and the d-axis and q-axis current signals $i_d$, $i_q$ obtained in the dp-axis converter are used to generate the current control signal. The step of S106 corresponds to the processes performed by the constant current command value generator 41 and the constant current control output unit 42.

Next, a control correction process is performed in the step S107. In the step of S107, the input current control signal generated in the step of S106 is added to the positive-phase-sequence components $e_{1dp}$, $e_{1qp}$ of the d-axis and q-axis voltage signals obtained by positive-phase negative-phase separation in the step of S101, and output signals $V_{dp}{*}^r$, $V_{qp}{*}^r$ as shown in the equations (44) and (45) are generated. Then, two-phase output signals $V_{dp*}{}^r$, $V_{qp}{*}^r$ are converted into the three-phase control signals $V_{1ap}$, $V_{1bp}$, and $V_{1cp}$. Then, the phase voltage signals $e_{1an}$, $e_{1bn}$, $e_{1cn}$ acquired in the step of S101 are added to the zero voltage signal $e_{1o}$, further added to the control signals $V_{1ap}$, $V_{1bp}$, and $V_{1cp}$, thereby generating a gate control signal.

Then, a triangle wave signal is generated, and by comparing the triangle wave signal with the gate control signal, a gate pulse signal is generated. Subsequently, the gate pulse signal is outputted to each of the gates of the semiconductor switching element of the three-phase PWM circuit 200a in the three-phase converter 200.

The step of S107 corresponds to the processes performed in the adder 30, the dp-axis converter 83, the constant current control output units 42a and 42b, the dq-axis converter 84, and the three-phase PWM control pulse generator 200b.

In the step S108, it is determined whether or not the power conversion control process, the unbalanced voltage compensation process, and the power factor and reactive power control are terminated. If those processes are not terminated, the process returns to the step of S101 and continues, whereas if they are terminated, the power conversion control process, the unbalanced voltage compensation process, and the power factor and reactive power control are brought to an end.

In the configuration for allowing the program to activate the CPU, similar to the case of the circuit configuration, it is possible to implement the functions of the unbalanced voltage compensation and the power conversion.

Next, with reference to FIG. 10 to FIG. 15, an explanation will be made regarding experimental examples of the unbalanced voltage compensation according to the present invention. Drawings from FIG. 10 to FIG. 15 illustrate measurement data, which is obtained when the three-phase converter is controlled by the unbalanced voltage compensator according to the configuration example as shown in FIG. 7.

Measurement is performed under the condition that the three-phase rated line voltage is 200 V, the three-phase rated line current is 17.5 A, the carrier frequency is 18.5 kHz, the DC link voltage (output voltage) is 380 V, the DC link capacity is 1,200 μF, the transmission line inductance is 300 μH, and the load resistance is 25Ω. Then, from the state where the three-phase rated line voltage is 200 V and the three-phase rated line current is 17.5 A, the voltage is suddenly dropped to the unbalanced voltage and then recovered. Under this condition, an influence is compared between the case where the unbalance in voltage is compensated for and the case there is no compensation. Here, the influence is represented by the fluctuations in the output voltage $V_{dc}$ and the input current $i_a$, $i_b$, $i_c$, which are caused by the three-phase unbalanced voltages generated by the instantaneous voltage drop, or the like. According to the results of the experiments, it is possible to check the effectiveness of the unbalanced voltage compensation control.

Figure 10A:
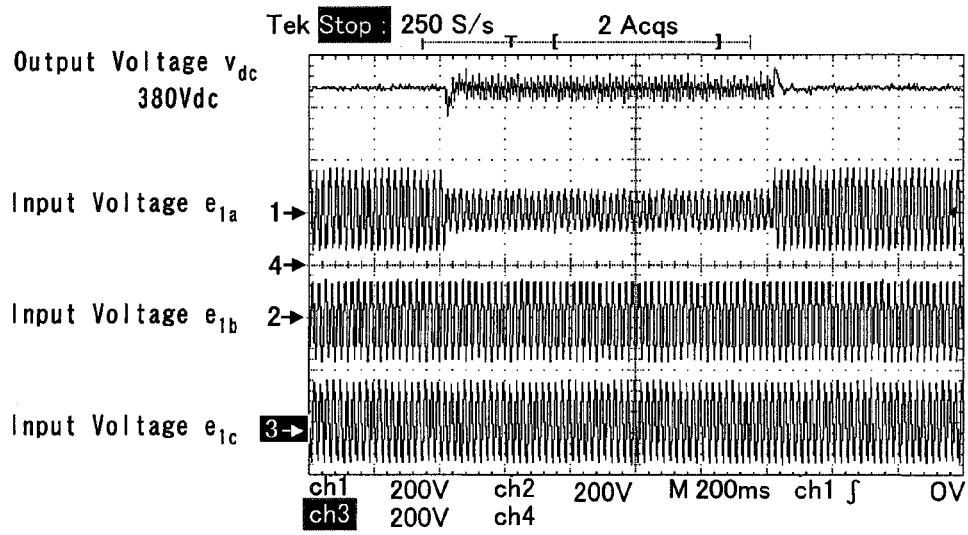
FIG. 10 illustrates experimental examples of the unbalanced voltage compensation according to the present invention.
Figure 10B:
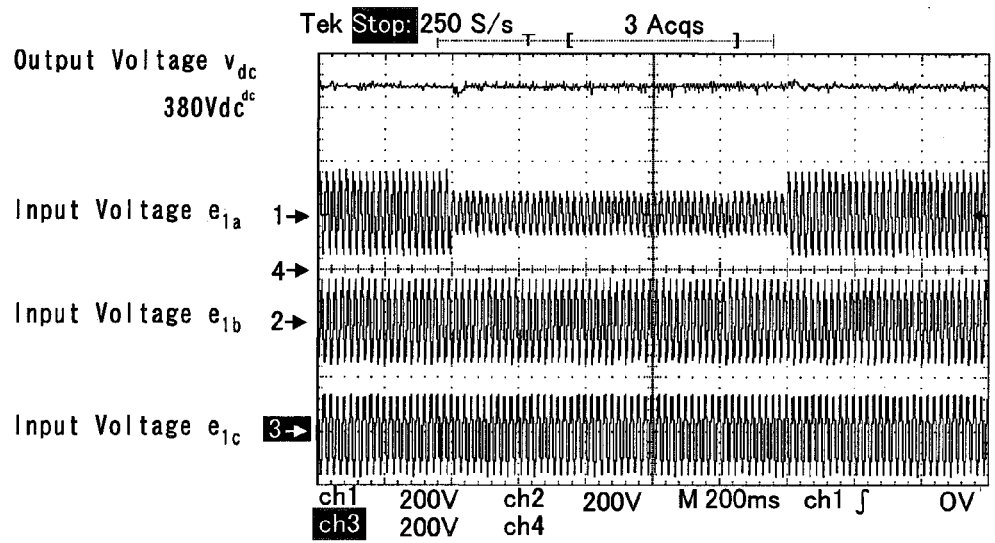

FIG. 10 shows characteristics in the case where the input phase voltage $e_{1a}$ suddenly dropped to 50%, and thereafter it was resumed to 100%. FIG. 10A illustrates the case where the unbalanced voltage compensation was not performed; and FIG. 10B illustrates the case where the unbalanced voltage compensation according to the present invention was performed. In the case where the unbalanced voltage compensation was performed, the output voltage $V_{dc}$ was kept constant, and there was shown a favorable performance.

Figure 11A:
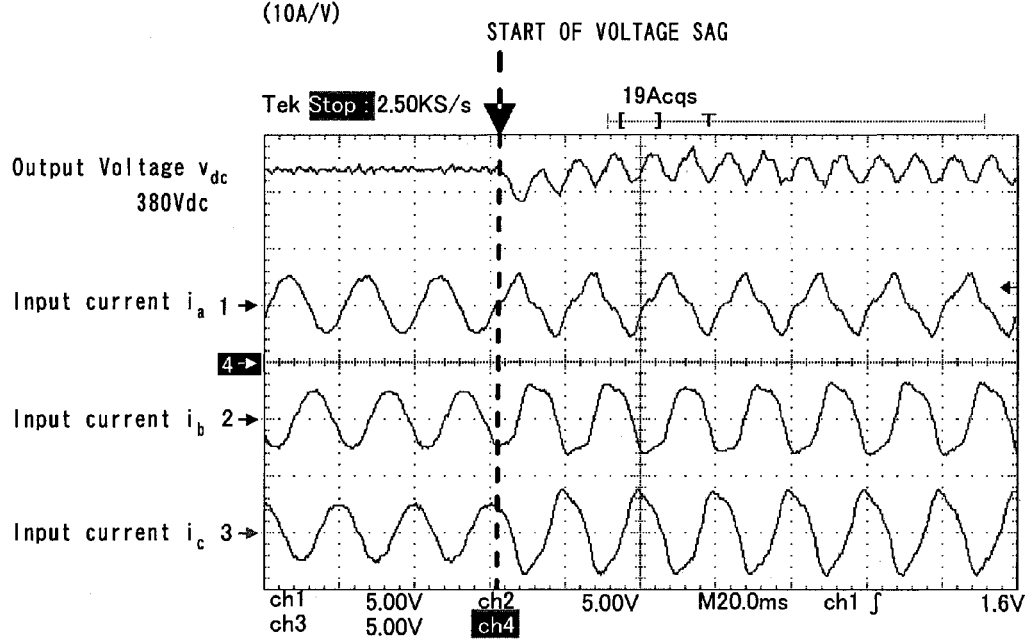
FIG. 11 illustrates experimental examples of the unbalanced voltage compensation according to the present invention.
Figure 11B:
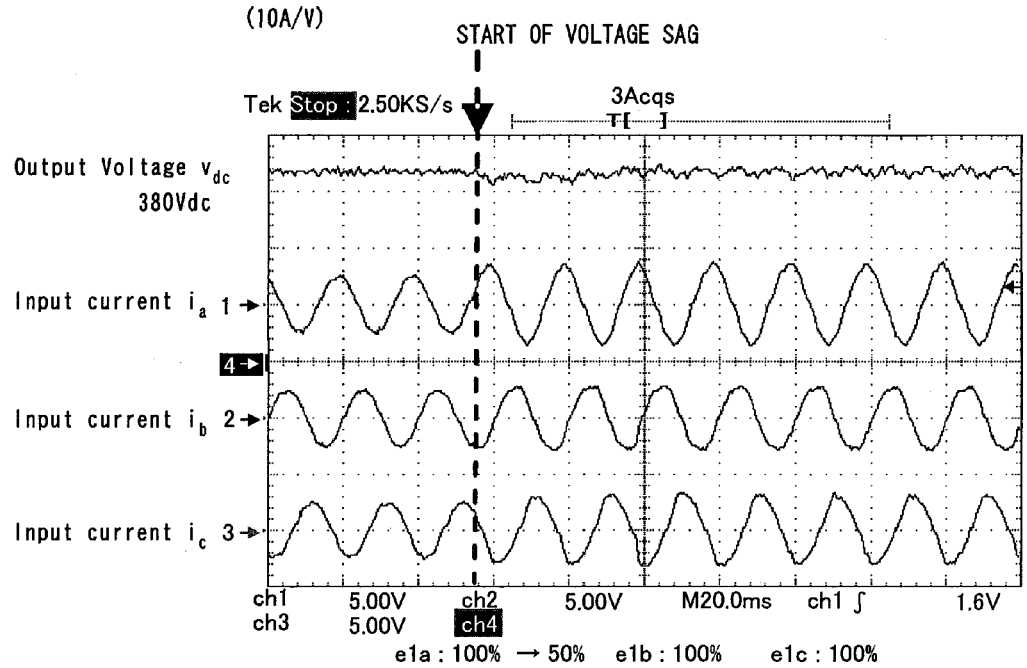
Figure 12A:
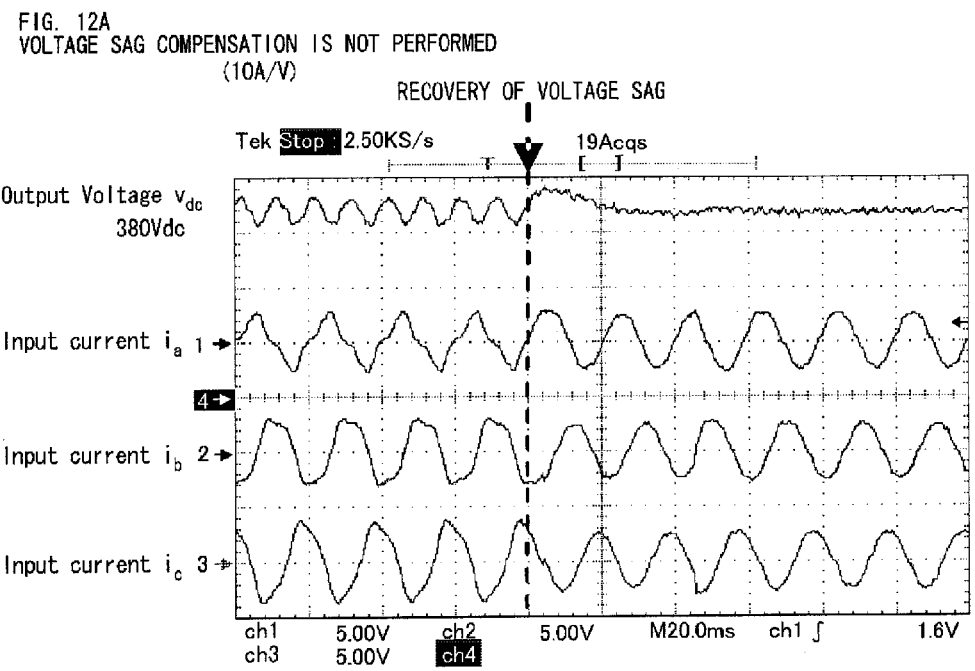
FIG. 12 illustrates experimental examples of the unbalanced voltage compensation according to the present invention.
Figure 12B:
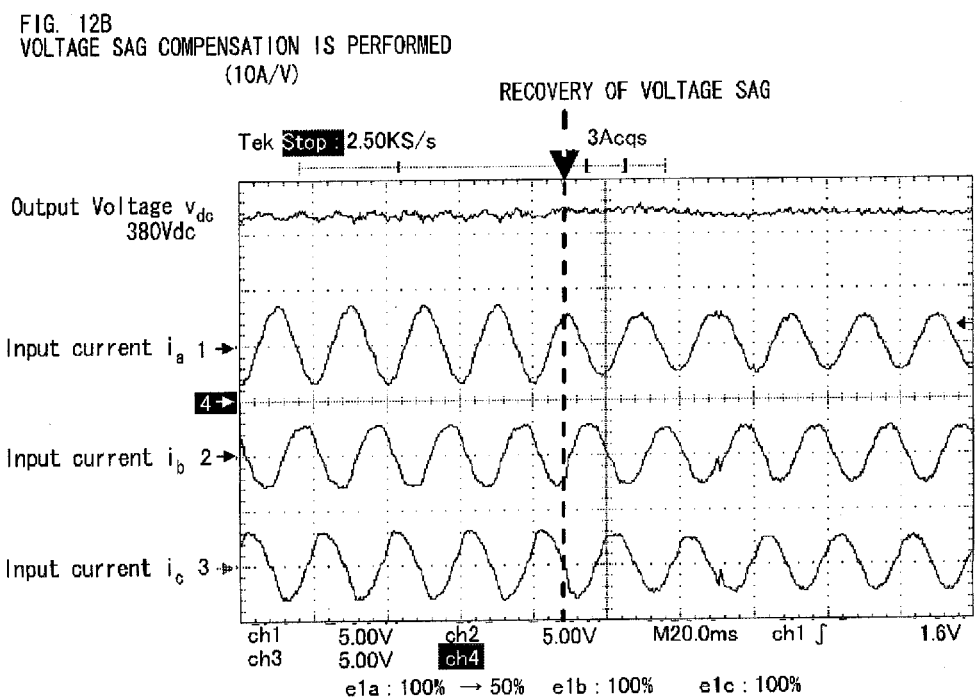

FIG. 11 and FIG. 12 are enlarged views of FIG. 10, and FIG. 11 illustrates the case where the input phase voltage $e_{1a}$ suddenly dropped from 100% to 50%; and FIG. 12 illustrates the case where the input phase voltage $e_{1a}$ recovered from 50% to 100%. FIG. 11A and FIG. 12A illustrate the case where the unbalanced voltage compensation was not performed; and FIG. 11B and FIG. 12B illustrate the case where the unbalanced voltage compensation according to the present invention was performed. It is possible to read from the figures that the input current $i_a$, $i_b$, $i_c$ made a high-speed response from the sudden change point.

Figure 13A:
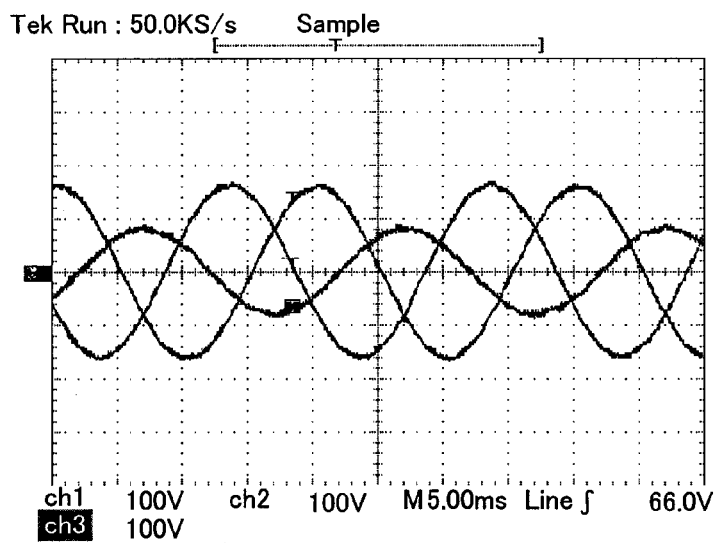
FIG. 13 illustrates experimental examples of the unbalanced voltage compensation according to the present invention.
Figure 13B:
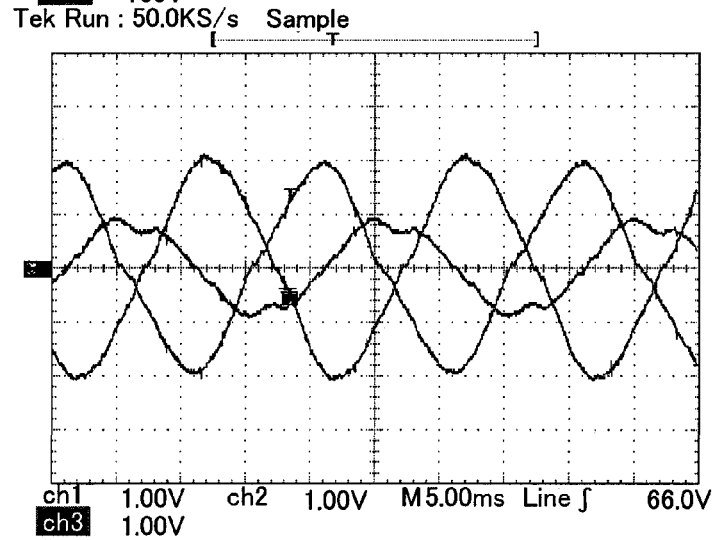
Figure 13C:
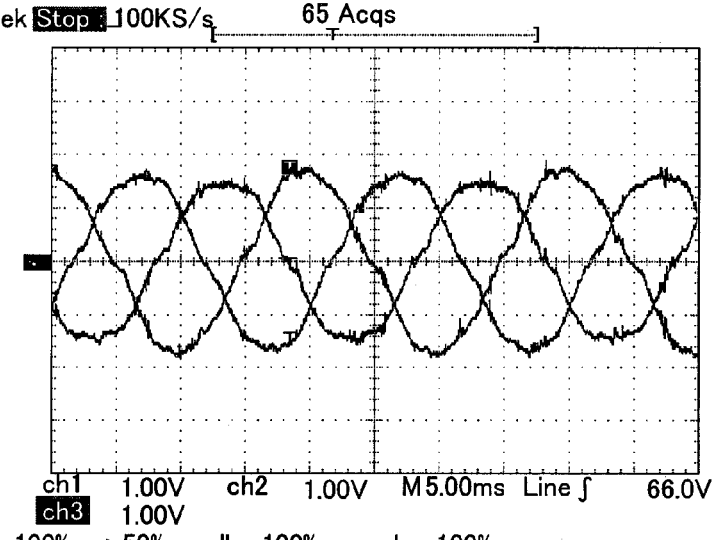

FIG. 13 illustrates a comparison of characteristics, when the input phase voltage $e_a$ of the three-phase AC power source 100 shown in FIG. 7 was dropped by 50%. FIG. 13A illustrates the input voltages, FIG. 13B illustrates the case where the unbalanced voltage compensation was not performed, and FIG. 13C illustrates the case where the unbalanced voltage compensation according to the present invention was performed.

As shown in FIG. 13B, when the unbalanced voltage compensation was not performed, it is found that there were a large unbalance in amplitude of input current and displacement of phase angle.

FIG. 13 shows an example where the power factor is set to "1", and as shown in FIG. 13C, it is found that an effect from the compensation control by performing the unbalanced voltage compensation of the present invention brought about a favorable balance both in amplitude of the input current and the phase angle.

Figure 14A:
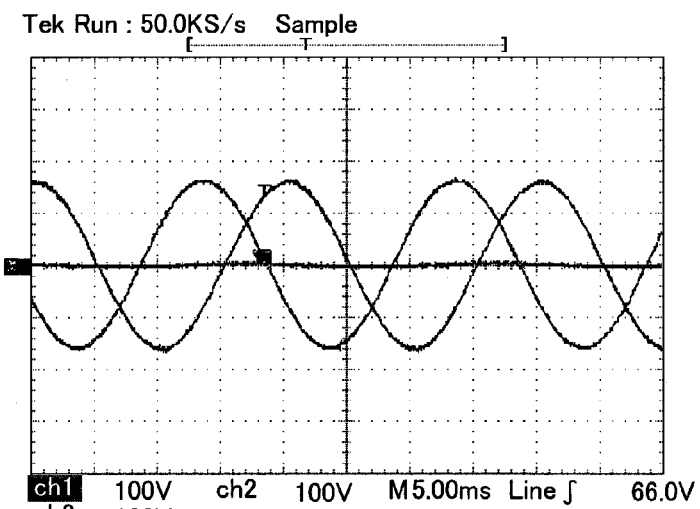
FIG. 14 illustrates experimental examples of the unbalanced voltage compensation according to the present invention.
Figure 14B:
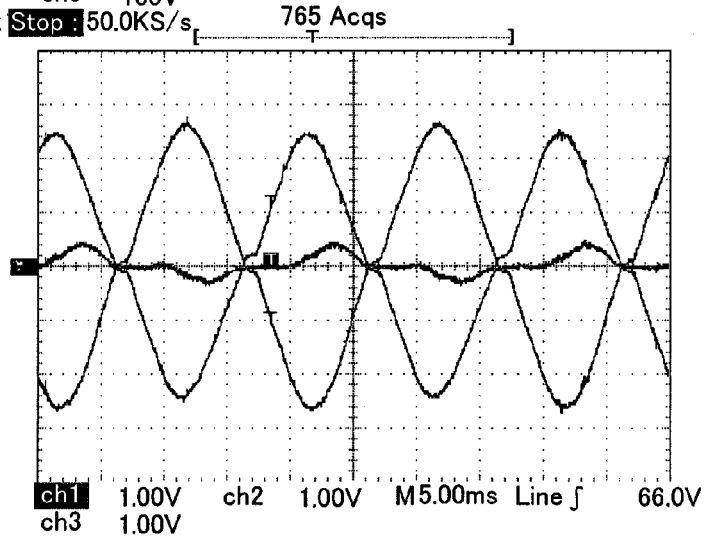
Figure 14C:
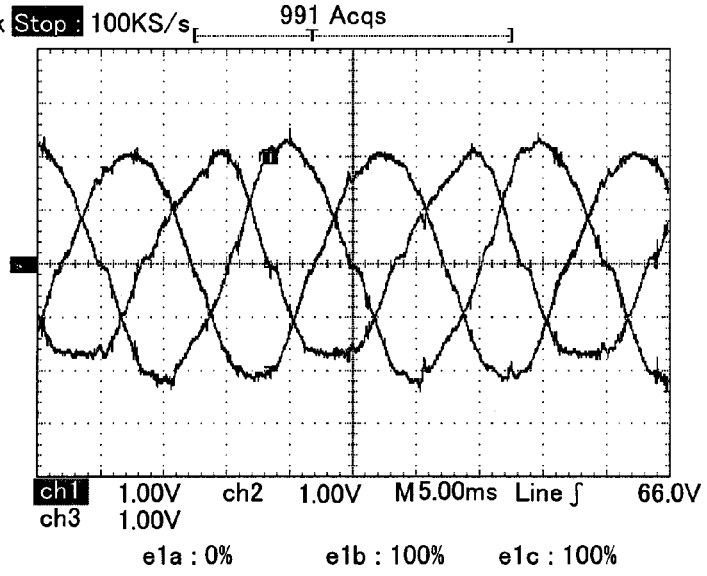

FIG. 14 illustrates the case that the input phase voltage $e_a$ from the three-phase AC power source 100 of FIG. 7 was dropped by 100% and reached zero voltage. FIG. 14A illustrates the input voltages, FIG. 14B illustrates the case where the unbalanced voltage compensation was not performed, and FIG. 14C illustrates the case where the unbalanced voltage compensation according to the present invention was performed.

The result of FIG. 14C shows that according to the unbalanced voltage compensation of the present invention, when the voltage sag occurred due to earth fault, that is, even when the input phase voltage $e_a$ from the three-phase AC power source 100 of FIG. 7 was dropped by 100% and reached the zero voltage, it is possible to keep the amplitude and the phase angle of the input current $i_a$, $i_b$, $i_c$ to be nearly balanced in three phases.

Figure 15:
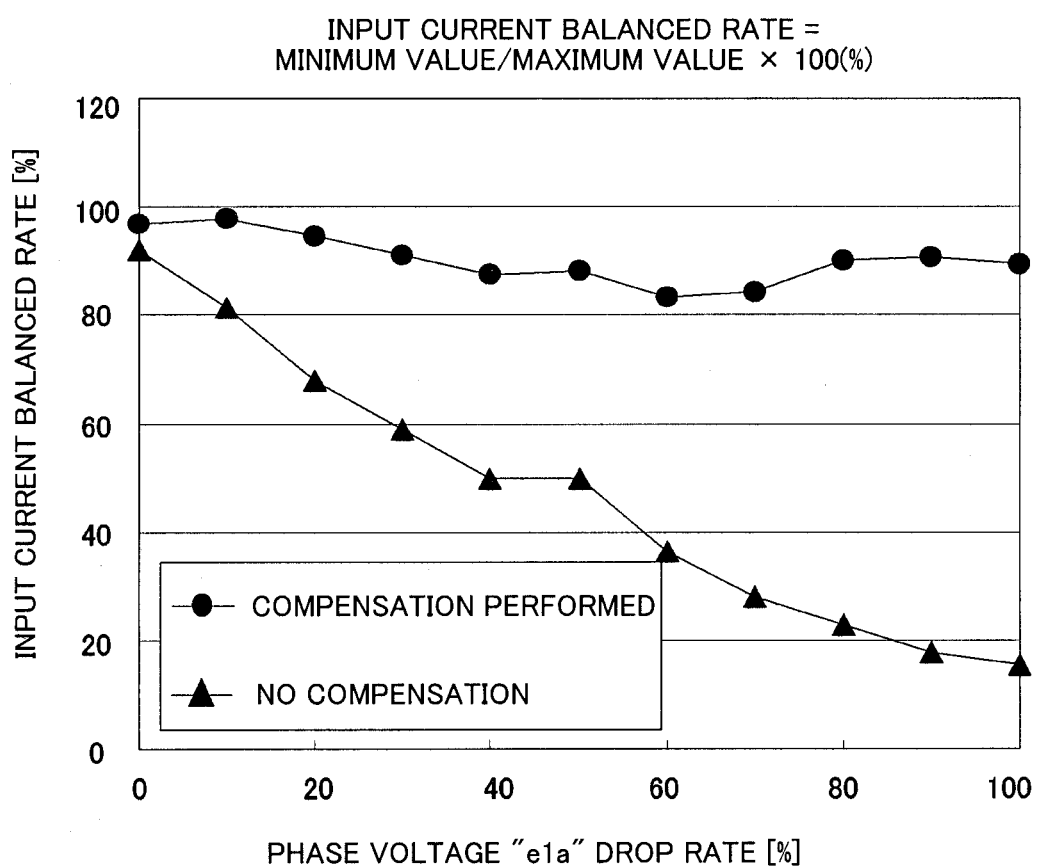
FIG. 15 illustrates an experimental example of the unbalanced voltage compensation according to the present invention.
Figure 16:
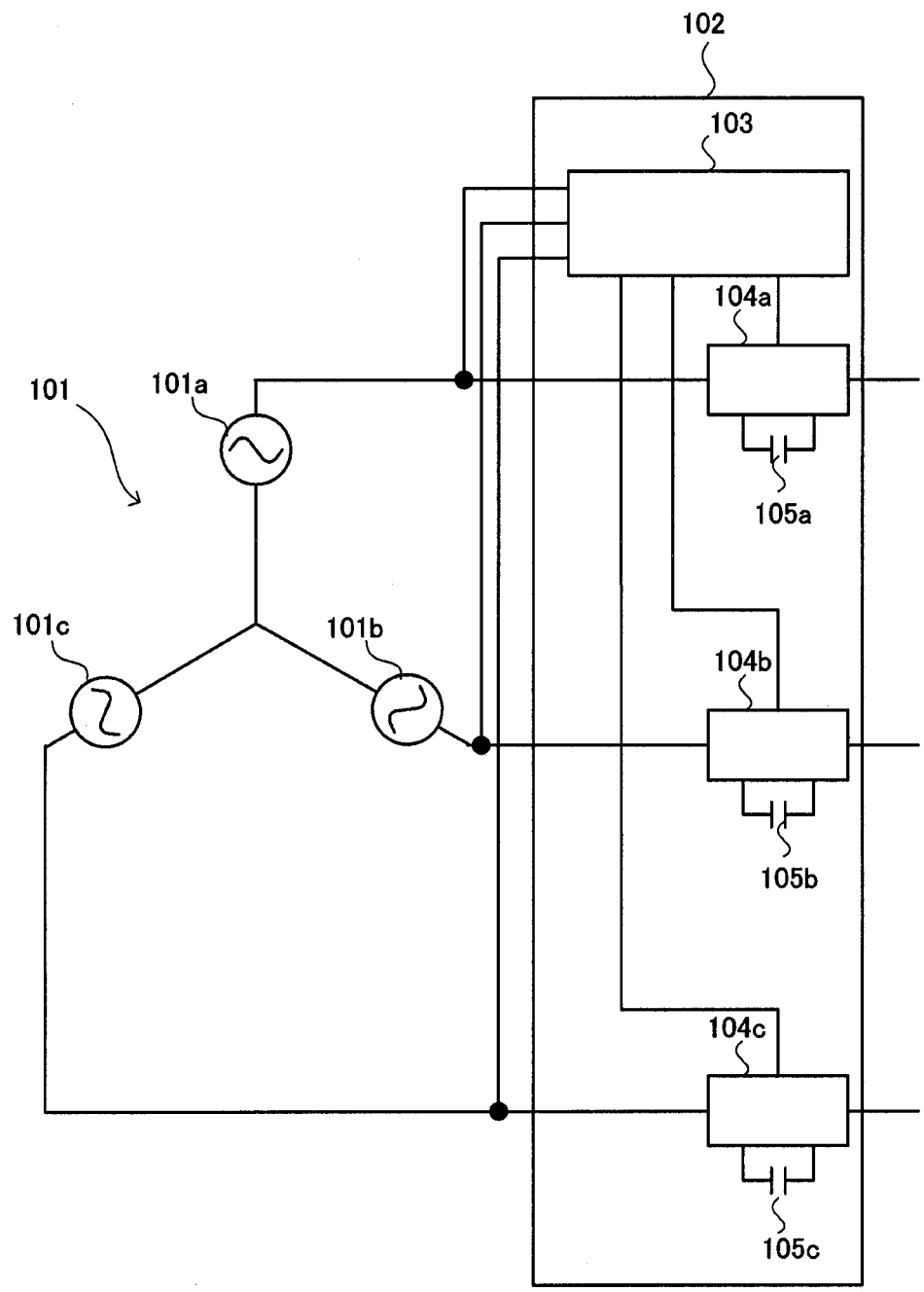
FIG. 16 illustrates a configuration example of a conventional voltage fluctuation compensator.

FIG. 15 illustrates an input phase voltage drop rate and an input current balanced rate. According to FIG. 15, in the case where the unbalanced voltage compensation was not performed (triangle marks in the figure), when the input phase voltage drop rate was 20%, the input current balanced rate was 67.9%. On the other hand, in the case where the unbalanced voltage compensation of the present invention was performed, favorable characteristics were shown as the following; when the input phase voltage drop rate was 20%, the input current balanced rate was 94.5%, and the input current balanced rate was kept in the range from 97.9% to 83.3% across the overall input phase voltage drop rate, from 0% to 100%.

The results above have been obtained by the experiment conducted by applying the unbalanced voltage compensation of the present invention to a representative 5 kW RF (Radio Frequency) generator, which is used as semiconductor manufacturing equipment, liquid crystal manufacturing equipment, or the like, and such equipment is capable of achieving the performance which satisfies the voltage sag standard (SEMI F47-0200) (1) required in the semiconductor manufacturing equipment or the like.

By way of example, the maximum voltage drop rate and duration at the voltage sag, as defined in the voltage sag standard (SEMI F47-0200) (1): Percent of nominal voltage and duration of voltage sag in seconds are 50% and 0.2 seconds. As shown in the experimental result of FIG. 10 in association with this standard, when the experiment was conducted with the maximum voltage drop rate of 50% and the duration of 1 second in the event of voltage sag, the voltage reduction was able to be improved drastically by performing the voltage sag compensation according to the unbalanced voltage compensation of the present invention, though the voltage drop time in the measurement data was extended 5 times longer than the standard value (=1 second/0.2 seconds).

As described above, according to the unbalanced voltage compensation and the power factor and reactive power control of the present invention, it is possible to compensate for the instantaneous voltage drop, and even at the time of instantaneous voltage drop of the input voltage, power is supplied stably to the DC load. Therefore, compared to the configuration of the instantaneous voltage drop compensation which utilizes a storage device such as a capacitor and a storage battery, it is possible to achieve a configuration for performing the instantaneous voltage drop compensation, being smaller in size, longer in life, and lower in cost. In addition, since the storage device method such as a capacitor and a storage battery is not employed, it is easy to do maintenance for the configuration of the instantaneous voltage drop compensation. Furthermore, since the power factor can be improved, a higher harmonic wave can be suppressed by the power factor improvement.

According to the unbalanced voltage compensation and the power factor and reactive power control of the present invention, in particular when the PFC control is employed, there are advantages including the followings; there is little need of new plant and equipment spending, the size is drastically reduced by eliminating the storage device unit, and periodical maintenance of capacitor unit can be eliminated.

In addition, according to the unbalanced voltage compensation and the power factor and reactive power compensation of the present invention, even when there occurs an extreme voltage sag, i.e., in the event of nearly earth fault, it is possible to perform the unbalance compensation control as far as an active phase remains as a energy source.

The constant current command value generator generates current command value signals, from the positive-phase-sequence components of the d-axis and q-axis voltage signals based on the AC input voltages, and the DC voltage control signal based on the DC output voltage, thereby enabling a quick response by the input current command signal against the fluctuations of the AC input voltages, and excessive fluctuations of the DC output voltage can be suppressed.

On the output side, the current detector, the voltage detector, and the adder detect a DC output power signal, and the adder adds the DC output power signal to the DC voltage control signal, whereby the average active power operation unit allows a quick response against the load amount fluctuations of the DC load which outputs the DC output power, and suppresses the excessive fluctuations of the DC output voltage.

The synchronous signal generator generates a synchronous signal, and each of the dq-axis converters performs the conversion according to the synchronous signal "s", from three-phase to two-phase or from two-phase to three-phase, thereby constantly keeping the power factor to 1, regardless of whether the AC input voltages are balanced or unbalanced.

In addition, the centroid vector operation unit of the present invention detects the line voltage signals of the AC input voltages and converts the signals to phase voltages, and therefore, it is possible to compensate for the instantaneous voltage drop at every measurement point of time, regardless of whether the AC system of the three-phase AC power source is three-phase three-wire system, or three-phase four-wire system.

It should be understood that disclosed embodiments and the descriptions of the modification examples are just examples of the controller of the three-phase converter, the method for controlling the power factor of the three-phase converter, and the method for controlling the reactive power of the three-phase converter. The present invention is not limited to those embodiments, and it is susceptible of changes and modifications without departing from the scope of the invention. Therefore, such modifications fall within the ambit of the present invention.

The present invention can be applied to a facility which requires a stable power supply being small in voltage fluctuations on the load side, such as semiconductor manufacturing equipment, in particular.

What is claimed is:

1. A method for controlling a power factor of a three-phase converter, when power is converted by the three-phase converter which subjects three-phase AC to PWM conversion for outputting DC, comprising,
  a symmetrical component calculation step for calculating symmetrical component voltage values of a three-phase balanced system, from wye-phase voltages of three-phase AC input of the three-phase converter,
  an average active power operation step for calculating an average active power value by using an output voltage value and an output current value of a DC output from the three-phase converter,
  a power factor control step for calculating an average reactive power value, from the average active power value calculated in the average active power operation step and a set power factor, based on a relationship among the average active power value, the average reactive power value, and a power factor, the average reactive power value being associated with the set power factor,
  a current command value generation step for calculating a current command value, from the average active power value calculated in the average active power operation step, the average reactive power value calculated in the power factor control step, and the symmetrical component voltage values of three-phase AC voltages calculated in the symmetrical component calculation step, and
  a constant current control step for calculating a constant current control value by subjecting a positive-phase-sequence voltage value of the three-phase AC voltages to constant current control, based on the current command value and an input current value of the three-phase converter, wherein,
  a compensation signal for compensating for unbalanced voltages of the three-phase AC voltages and a control signal for controlling the power factor are generated, based on the constant current control value calculated in the constant current control step,
  wye-phase voltages being 120° out of phase with each other for controlling the unbalanced voltages and the power factor are obtained based on the compensation signal and the control signal, and
  a PWM control signal for subjecting the three-phase AC to the PWM conversion for outputting DC is generated, based on the wye-phase voltages thus obtained.

2. The method for controlling the power factor of the three-phase converter according to claim 1, further comprising a centroid vector operation step for obtaining wye-phase voltages being 120° out of phase with each other, from line voltages of the three-phase AC, wherein,
  the centroid vector operation step performs a vector operation as to all combinations of two line voltages which are selected from the line voltages, obtains centroid vector voltages which are directed to respective terminal voltages from a terminal-voltage centroid according to the vector operation, and renders the vector voltages respectively as the wye-phase voltages which are 120° out of phase with each other, and
  the symmetrical component calculation step calculates symmetrical component voltage values of the three-phase balanced system from the wye-phase voltages of the three-phase AC input of the converter, the wye-phase voltages being obtained in the centroid vector operation step.

3. The method for controlling the power factor of the three-phase converter according to claim 2, wherein,
  the average active power operation step calculates the average active power value, by adding an integrated value of the output voltage value and the output current value of the DC output, to a value obtained by subjecting a difference between the output voltage value and a voltage command value to a proportional-integral control.

4. The method for controlling the power factor of the three-phase converter according to claim 1, wherein,
  the average active power operation step calculates the average active power value, by adding an integrated value of the output voltage value and the output current value of the DC output, to a value obtained by subjecting a difference between the output voltage value and a voltage command value to a proportional-integral control.

5. The method for controlling the power factor of the three-phase converter according to claim 1, wherein, the power factor control step calculates the average reactive power, by multiplying the average active power value by $[(1-(\text{set power factor})^2)^{1/2}/(\text{set power factor})]$.

6. The method for controlling the power factor of the three-phase converter according to claim 1, wherein,
the power factor control step sets the set power factor to be a negative value, and regenerates power of the average active power value, from the DC output side to the AC input side of the three-phase converter.

7. A method for controlling reactive power of a three-phase converter when power is converted by the three-phase converter which subjects three-phase AC to PWM conversion for outputting DC, comprising,
a symmetrical component calculation step for calculating symmetrical component voltage values of a three-phase balanced system, from wye-phase voltages of three-phase AC input of the three-phase converter,
an average active power operation step for calculating an average active power value by using an output voltage value and an output current value of DC output of the three-phase converter,
a reactive power control step for calculating an average reactive power value, from the average active power value calculated in the average active power operation step and a set power factor, on the basis of a relationship among the average active power value, the average reactive power value, and a power factor, the average reactive power value being associated with the set power factor,
a current command value generation step for calculating a current command value, from the average active power value calculated in the average active power operation step, the average reactive power value calculated in the reactive power control step, and the symmetrical component voltage values of the three-phase AC voltages calculated in the symmetrical component calculation step, and
a constant current control step for calculating a constant current control value by subjecting a positive-phase-sequence voltage value of the three-phase AC voltages to constant current control, based on the current command value and an input current value of the three-phase converter, wherein,
a compensation signal for compensating for unbalanced voltages of the three-phase AC voltages and a control signal for controlling the power factor are generated, based on the constant current control value calculated in the constant current control step,
wye-phase voltages being 120° out of phase with each other for controlling the unbalanced voltages and the reactive power are obtained based on the compensation signal and the control signal, and
a PWM control signal for subjecting the three-phase AC to the PWM conversion for outputting DC is generated based on the wye-phase voltages thus obtained.

8. The method for controlling the reactive power of the three-phase converter according to claim 7, further comprising a centroid vector operation step for obtaining wye-phase voltages being 120° out of phase with each other, from line voltages of the three-phase AC, wherein,
the centroid vector operation step performs a vector operation as to all combinations of two line voltages which are selected from the line voltages, obtains centroid vector voltages which are directed to respective terminal voltages from a terminal-voltage centroid according to the vector operation, and renders the vector voltages respectively as the wye-phase voltages which are 120° out of phase with each other, and the symmetrical component calculation step calculates symmetrical component voltage values of the three-phase balanced system, from the wye-phase voltages of the three-phase AC input of the converter, the wye-phase voltages being obtained in the centroid vector operation step.

9. The method for controlling the reactive power of the three-phase converter according to claim 8, wherein,
the average active power operation step calculates the average active power value by adding an integrated value of the output voltage value and the output current value of the DC output, to a value obtained by subjecting a difference between the output voltage value and a voltage command value to a proportional-integral control.

10. The method for controlling the reactive power of the three-phase converter according to claim 7, wherein,
the average active power operation step calculates the average active power value by adding an integrated value of the output voltage value and the output current value of the DC output, to a value obtained by subjecting a difference between the output voltage value and a voltage command value to a proportional-integral control.

11. The method for controlling the reactive power of the three-phase converter according to claim 7, wherein,
the reactive power control step calculates the average reactive power, by multiplying the average active power value by $[(1-(\text{set power factor})^2)^{1/2}/(\text{set power factor})]$.

12. A controller for controlling a three-phase converter which subjects three-phase AC to PWM conversion for outputting DC, comprising,
a symmetrical component calculation unit for calculating symmetrical component voltage values of a three-phase balanced system, from wye-phase voltages of three-phase AC input of the three-phase converter,
an average active power operation unit for calculating an average active power value by using an output voltage value and an output current value of DC output of the three-phase converter,
a power factor and reactive power control unit for calculating an average reactive power value, from the average active power value calculated in the average active power operation unit and a set power factor, on the basis of a relationship among the average active power value, the average reactive power value, and a power factor, the average reactive power value being associated with the set power factor,
a current command value generator for calculating a current command value, from the average active power value calculated in the average active power operation unit, the average reactive power value calculated in the power factor and reactive power control unit, and the symmetrical component voltage values of the three-phase AC voltages calculated in the symmetrical component calculation unit, and
a constant current control unit for calculating a constant current control value by subjecting a positive-phase-sequence voltage value of the three-phase AC voltages to constant current control, based on the current command value and an input current value of the three-phase converter, wherein,
a compensation signal for compensating for unbalanced voltages of the three-phase AC voltages and a control signal for controlling the power factor are generated, based on the constant current control value calculated in the constant current control unit,
wye-phase voltages being 120° out of phase with each other for controlling the unbalanced voltages and the power factor are obtained based on the compensation signal and the control signal, and a PWM control signal for subjecting the three-phase AC to the PWM conversion for outputting DC is generated based on the wye-phase voltages thus obtained.

13. The controller for controlling the three-phase converter according to claim 12, further comprising a centroid vector operation unit for obtaining wye-phase voltages being 120° out of phase with each other, from line voltages of the three-phase AC, wherein, the centroid vector operation unit performs a vector operation as to all combinations of two line voltages which are selected from the line voltages, obtains centroid vector voltages which are directed to respective terminal voltages from a terminal-voltage centroid according to the vector operation, and renders the vector voltages respectively as the wye-phase voltages which are 120° out of phase with each other, and the symmetrical component calculation unit calculates symmetrical component voltage values of the three-phase balanced system, from the wye-phase voltages of the three-phase AC input of the converter, the wye-phase voltages being obtained in the centroid vector operation unit.

14. The controller for controlling the three-phase converter according to claim 13, wherein, the average active power operation unit calculates the average active power value by adding an integrated value of the output voltage value and the output current value of the DC output, to a value obtained by subjecting a difference between the output voltage value and a voltage command value to a proportional-integral control.

15. The controller for controlling the three-phase converter according to claim 12, wherein, the average active power operation unit calculates the average active power value by adding an integrated value of the output voltage value and the output current value of the DC output, to a value obtained by subjecting a difference between the output voltage value and a voltage command value to a proportional-integral control.

16. The controller for controlling the three-phase converter according to claim 12, wherein, the power factor and reactive power control unit comprises,
a power factor setting unit for setting the power factor, and
an average reactive power operation unit for calculating the average reactive power by using the set power factor being set in the power factor setting unit, wherein,
the average reactive power operation unit calculates the average reactive power by performing an operation which multiplies the average active power value calculated in the average active power operation unit, by $[(1-(\text{set power factor})^2)^{1/2}/(\text{set power factor})]$.

17. The controller for controlling the three-phase converter according to claim 12, wherein, the power factor and reactive power control unit sets the set power factor to be a negative value, and regenerates power of the average active power value, from the DC output side to the AC input side of the three-phase converter.

* * * * *